United States Patent
Chiu et al.

(10) Patent No.: US 10,035,104 B2
(45) Date of Patent: Jul. 31, 2018

(54) BIOCHIP FOR HIGH-THROUGHPUT SCREENING OF CIRCULATING TUMOR CELLS

(75) Inventors: Daniel T. Chiu, Seattle, WA (US); Jason S. Kuo, Seattle, WA (US); J. Patrick Shelby, Bellevue, WA (US); David S. Lim, Seattle, WA (US)

(73) Assignee: University of Washington, Seattle, WA (US)

(*) Notice: Subject to any disclaimer, the term of this patent is extended or adjusted under 35 U.S.C. 154(b) by 1257 days.

(21) Appl. No.: 12/665,575

(22) PCT Filed: Jun. 12, 2008

(86) PCT No.: PCT/US2008/066770
§ 371 (c)(1),
(2), (4) Date: Jul. 14, 2010

(87) PCT Pub. No.: WO2008/157257
PCT Pub. Date: Dec. 24, 2008

(65) Prior Publication Data
US 2010/0323388 A1    Dec. 23, 2010

Related U.S. Application Data

(63) Continuation of application No. 11/766,053, filed on Jun. 20, 2007, now Pat. No. 8,841,135.

(51) Int. Cl.
*B01L 3/00*    (2006.01)
*B01L 3/02*    (2006.01)
(Continued)

(52) U.S. Cl.
CPC ......... *B01D 63/00* (2013.01); *B01D 67/0062* (2013.01); *B01L 3/502753* (2013.01);
(Continued)

(58) Field of Classification Search
USPC .................................. 422/500–504; 436/180
See application file for complete search history.

(56) References Cited

U.S. PATENT DOCUMENTS 4,923,608 A    5/1990    Flottmann et al.
5,234,594 A    8/1993    Tonucci et al.
(Continued)

FOREIGN PATENT DOCUMENTS

EP    0325752 A1    8/1989
EP    0368241 A2    5/1990
(Continued)

OTHER PUBLICATIONS

Chen, Xing et al., "Continuous Flow Microfluidic Device for Cell Separation, Cell Lysis and DNA Purification;" State Key Laboratory of Transducer Technology; Institute of Electronics, Chinese Academy of Science, Beijing; Science Direct, Analytica Chimica Acta 584; p. 237-243; 2007.

(Continued)

*Primary Examiner* — Dean Kwak
(74) *Attorney, Agent, or Firm* — Wilson Sonsini Goodrich & Rosati

(57) ABSTRACT

Embodiments in accordance with the present invention relate to the use of effusive filtration to segregate tumor cells from a sample of bodily fluid. In one embodiment, fluid containing a cell is flowed down a channel having a filtration medium present along at least one side wall. The tumor cell is captured when the fluid passes through the filtration medium. Accumulated pressure on the captured tumor cell is reduced by allowing the fluid that has passed through the filtration medium to re-enter the channel. In a particular embodiment, the filtration medium may comprise side wall (Continued)

apertures having a width smaller than that of the cell, with downstream apertures allowing re-entry of the fluid into the channel.

12 Claims, 15 Drawing Sheets

(51) Int. Cl.
*B01D 63/00* (2006.01)
*B01D 67/00* (2006.01)

(52) U.S. Cl.
CPC .... *B01D 2313/086* (2013.01); *B01D 2315/10* (2013.01); *B01L 2300/0681* (2013.01); *B01L 2400/0487* (2013.01); *Y10T 436/25375* (2015.01)

(56) References Cited

U.S. PATENT DOCUMENTS

| | | | |
|---|---|---|---|
| 5,316,952 A | 5/1994 | Brimhall | |
| 5,726,026 A * | 3/1998 | Wilding | B01D 67/0062 366/DIG. 3 |
| 5,731,211 A | 3/1998 | Ohlin | |
| 5,747,277 A | 5/1998 | Tsuchiya | |
| 5,837,115 A | 11/1998 | Austin et al. | |
| 6,143,247 A | 11/2000 | Sheppard, Jr. et al. | |
| 6,623,860 B2 | 9/2003 | Hu et al. | |
| 6,720,157 B2 | 4/2004 | Indermuhle et al. | |
| 6,730,516 B2 | 5/2004 | Jedrejewski et al. | |
| 6,949,355 B2 | 9/2005 | Yamanishi et al. | |
| 7,217,542 B2 | 5/2007 | Tyvoll et al. | |
| 7,993,821 B2 | 8/2011 | Chiu et al. | |
| 8,173,413 B2 | 5/2012 | Chiu et al. | |
| 8,669,044 B2 | 3/2014 | Chiu et al. | |
| 8,841,135 B2 | 9/2014 | Chiu et al. | |
| 9,157,839 B2 | 10/2015 | Chiu et al. | |
| 9,733,165 B2 | 8/2017 | Chiu et al. | |
| 2002/0164824 A1 | 11/2002 | Xiao et al. | |
| 2002/0164825 A1 | 11/2002 | Chen | |
| 2005/0003411 A1 | 1/2005 | Chiu et al. | |
| 2006/0134599 A1* | 6/2006 | Toner | B01L 3/502746 435/4 |
| 2006/0204400 A1 | 9/2006 | Blattert et al. | |
| 2007/0037172 A1 | 2/2007 | Chiu et al. | |
| 2007/0160503 A1* | 7/2007 | Sethu | A61M 1/3633 422/400 |
| 2007/0160504 A1 | 7/2007 | Parthasarathy et al. | |
| 2008/0135502 A1* | 6/2008 | Pyo | B01L 3/502753 210/801 |
| 2008/0240987 A1 | 10/2008 | Yamada et al. | |
| 2008/0248499 A1 | 10/2008 | Chiu et al. | |
| 2008/0318324 A1 | 12/2008 | Chiu et al. | |
| 2010/0012586 A1* | 1/2010 | Angelescu | B01D 61/18 210/637 |
| 2010/0279321 A1 | 11/2010 | Chiu et al. | |
| 2011/0005932 A1* | 1/2011 | Jovanovich | G01N 35/00029 204/453 |
| 2011/0020459 A1* | 1/2011 | Achrol | B01L 3/502753 424/520 |
| 2012/0295340 A1 | 11/2012 | Chiu et al. | |
| 2013/0078163 A1* | 3/2013 | Chung | C12M 21/06 422/502 |
| 2013/0302883 A1* | 11/2013 | Fowler | C12Q 1/686 435/287.2 |
| 2014/0220673 A1 | 8/2014 | Chiu et al. | |
| 2017/0165667 A1* | 6/2017 | Beaumont | B01L 3/502753 |

FOREIGN PATENT DOCUMENTS

| | | |
|---|---|---|
| WO | WO-9813131 A1 | 4/1998 |
| WO | WO-2004113877 A1 | 12/2004 |
| WO | WO 2006/079007 A2 | 7/2006 |
| WO | WO 2006/104474 A2 | 10/2006 |
| WO | WO 2006/116327 A1 | 11/2006 |
| WO | WO 2006/127256 A2 | 11/2006 |
| WO | WO-2006079007 A3 | 11/2006 |
| WO | WO-2006104474 A3 | 2/2007 |
| WO | WO-2007021409 A1 | 2/2007 |
| WO | WO-2006127256 A3 | 4/2009 |

OTHER PUBLICATIONS

Konan Peck et al., "Detection and Quantification of Circulating Cancer Cells in the Peripheral Blood Lung Cancer Patients;" Institute of Biomedical Science, Academia Sinica, Taipei; Cancer Research 58, p. 2761-2765; Jul. 1, 1998.
Palaniappan Sethu et al., "Microfluidic Diffusive Filter for Apheresis (Leukapheresis);" Lab Chip 2006; 6; p. 83-89.
Liang Zhu et al., "Filter-based Microfluidic Device as a Platform for Immunofluorescent Assay of Microbial Cells;" Miniaturisation for Chemistry, Biology and Bioengineering; The Royal Society of Chemistry 2004; Lab Chip, 2004, 4 p. 337-341.
International Search Report and Written Opinion of PCT Application No. PCT/US08/66770, dated Sep. 4, 2008, 09 pages total.
Yang et al. "Micromachined membrane particle filters." Sensors and Actuators A, 1999, 73, pp. 184-191.
Merriam-Webster's definition of "fluid." Date: Jun. 14, 2010.
Office action dated Jan. 26, 2009 for U.S. Appl. No. 11/766,053.
Office action dated Jun. 8, 2009 for U.S. Appl. No. 11/766,053.
Office action dated Jun. 16, 2010 for U.S. Appl. No. 11/766,053.
Office action dated Dec. 15, 2009 for U.S. Appl. No. 11/766,053.
Office action dated Apr. 23, 2013 for U.S. Appl. No. 11/766,053.
Balakrishnan, et al. An inexpensive, simple, and manual method of CD4 T-cell quantitation in HIV-infected individuals for use in developing countries. J Acquir Immune Defic Syndr. Aug. 15, 2004;36(5):1006-10.
Brandt, et al. Isolation of blood-borne epithelium-derived c-erbB-2 oncoprotein-positive clustered cells from the peripheral blood of breast cancer patients. Int J Cancer. Jun. 10, 1998;76(6):824-8.
Brandt, et al. Isolation of prostate-derived single cells and cell clusters from human peripheral blood. Cancer Res. Oct. 15, 1996;56(20):4556-61.
CDC. 1997 revised guidelines for performing CD4+ T-cell determinations in persons infected with human immunodeficiency virus (HIV). Centers for Disease Control and Prevention. MMWR Recomm Rep. Jan. 10, 1997;46(RR-2):1-29.
Cooke, et al. Falciparum malaria: sticking up, standing out and out-standing. Parasitol Today. Oct. 2000;16(10):416-20.
Cranston, et al. Plasmodium falciparum maturation abolishes physiologic red cell deformability. Science. Jan. 27, 1984;223(4634):400-3.
De Martini, et al. Immunologic alterations in human immunodeficiency virus infection: a review. J Clin Lab Anal. 1989;3(1):56-70.
Didier, et al. Comparative assessment of five alternative methods for CD4+ T-lymphocyte enumeration for implementation in developing countries. J Acquir Immune Defic Syndr. Feb. 1, 2001;26(2):193-5.
Dondorp, et al. Reduced microcirculatory flow in severe falciparum malaria: pathophysiology and electron-microscopic pathology. Acta Trop. Feb. 2004;89(3):309-17.
Glenister, et al. Contribution of parasite proteins to altered mechanical properties of malaria-infected red blood cells. Blood. Feb. 1, 2002;99(3):1060-3.
Greve, et al. A new no-lyse, no-wash flow-cytometric method for the determination of CD4 T cells in blood samples. Transfusion Medicine and Hemotherapy 30, 8-13 (2003).
Greve, et al. High-grade loss of leukocytes and hematopoietic progenitor cells caused by erythrocyte-lysing procedures for flow cytometric analyses. J Hematother Stem Cell Res. Jun. 2003;12(3):321-30.
Griwatz, et al. An immunological enrichment method for epithelial cells from peripheral blood. J Immunol Methods. Jun. 28, 1995;183(2):251-65.
He, et al. Microfabricated filters for microfluidic analytical systems. Anal Chem. Apr. 1, 1999;71(7):1464-8.

(56) References Cited

OTHER PUBLICATIONS

International search report and written opinion dated Oct. 3, 2008 for PCT/US2008/066685.
International search report and written opinion dated Oct. 31, 2006 for PCT/US2006/027099.
Kahn, et al. Enumeration of circulating tumor cells in the blood of breast cancer patients after filtration enrichment: correlation with disease stage. Breast Cancer Res Treat. Aug. 2004;86(3):237-47.
Krivacic, et al. A rare-cell detector for cancer. Proc Natl Acad Sci U S A. Jul. 20, 2004;101(29):10501-4. Epub Jul. 12, 2004.
Kuo, et al. Deformability considerations in filtration of biological cells. Lab Chip. Apr. 7, 2010;10(7):837-42. doi: 10.1039/b922301k. Epub Jan. 19, 2010.
Lim, et al. Parametric investigation on the effect of channel topologies on electrophoretic separations. J Chromatogr A. Feb. 20, 2004;1027(1-2):237-44.
Metz, et al. Polyimide microfluidic devices with integrated nanoporous filtration areas manufactured by micromachining and ion track technology. Journal of Micromechanics and Microengineering 14, 324-331 (2004).
Miller, et al. Malaria pathogenesis. Science. Jun. 24, 1994;264(5167):1878-83.
Mocellin, et al. Circulating tumor cells: the 'leukemic phase' of solid cancers. Trends Mol Med. Mar. 2006;12(3):130-9. Epub Feb. 20, 2006.
Moorthy, et al. In situ fabricated porous filters for microsystems. Lab Chip. May 2003;3(2):62-6. Epub Apr. 30, 2003.
Nash, et al. Abnormalities in the mechanical properties of red blood cells caused by Plasmodium falciparum. Blood. Aug. 1, 1989;74(2):855-61.
Naume, et al. Immunomagnetic techniques for the enrichment and detection of isolated breast carcinoma cells in bone marrow and peripheral blood. J Hematother. Apr. 1997;6(2):103-14.
Naume, et al. Increased sensitivity for detection of micrometastases in bone-marrow/peripheral-blood stem-cell products from breast-cancer patients by negative immunomagnetic separation. Int J Cancer. Nov. 23, 1998;78(5):556-60.
Office action dated Nov. 10, 2016 for U.S. Appl. No. 14/170,381.
Pantel, et al. Occult micrometastasis: enrichment, identification and characterization of single disseminated tumour cells. Semin Cancer Biol. Oct. 2001;11(5):327-37.
Payne. Use and limitations of light microscopy for diagnosing malaria at the primary health care level. Bull World Health Organ. 1988;66(5):621-6.
Shelby, et al. A microfluidic model for single-cell capillary obstruction by Plasmodium falciparum-infected erythrocytes. Proc Natl Acad Sci U S A. Dec. 9, 2003;100(25):14618-22. Epub Nov. 24, 2003.
Vona, et al. Impact of cytomorphological detection of circulating tumor cells in patients with liver cancer. Hepatology. Mar. 2004;39(3):792-7.
Vona, et al. Isolation by size of epithelial tumor cells : a new method for the immunomorphological and molecular characterization of circulatingtumor cells. Am J Pathol. Jan. 2000;156(1):57-63.
Warhurst, et al. ACP Broadsheet No. 148. Jul. 1996. Laboratory diagnosis of malaria. J Clin Pathol. Jul. 1996;49(7):533-8.
World Health Organization. Fact Sheet No. 94 (W.H.O., Geneva, Mar. 2002).
Zabaglo, et al. Cell filtration-laser scanning cytometry for the characterisation of circulating breast cancer cells. Cytometry Part A 55A, 102-108 (2003).
Office action dated Dec. 18, 2013 for U.S. Appl. No. 11/766,053.
Notice of allowance dated Mar. 1, 2017 for U.S. Appl. No. 14/170,381.
Notice of allowance dated Jun. 7, 2017 for U.S. Appl. No. 14/170,381.
Office Action dated Oct. 4, 2017 for EP Patent Application No. 06787055.0.

* cited by examiner

FIG. 1A
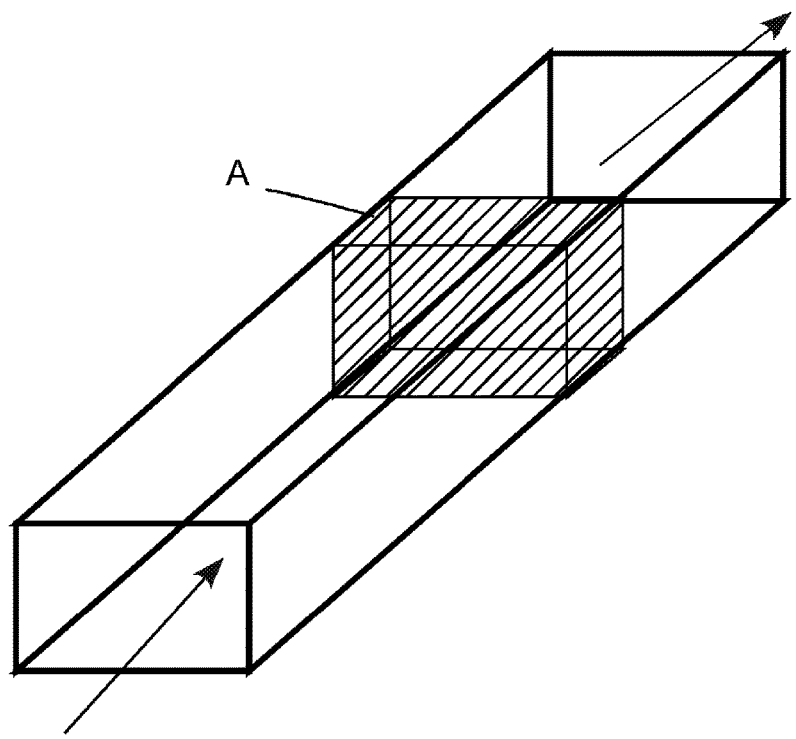
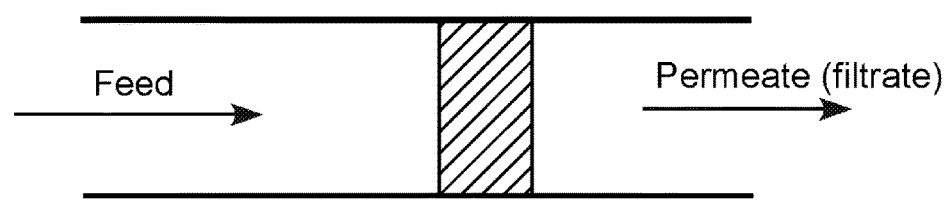
FIG. 1B

FIG. 1C
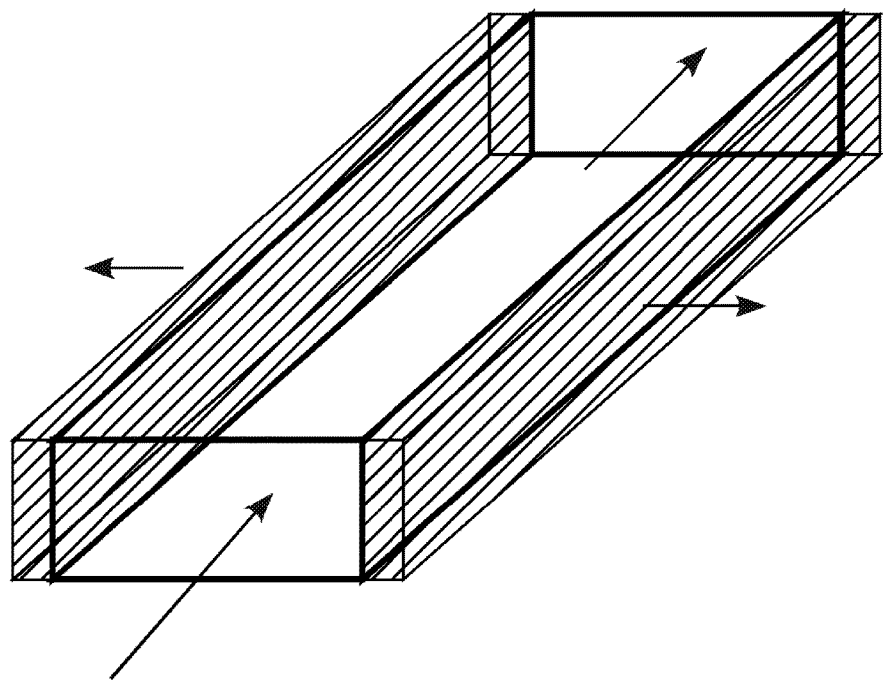
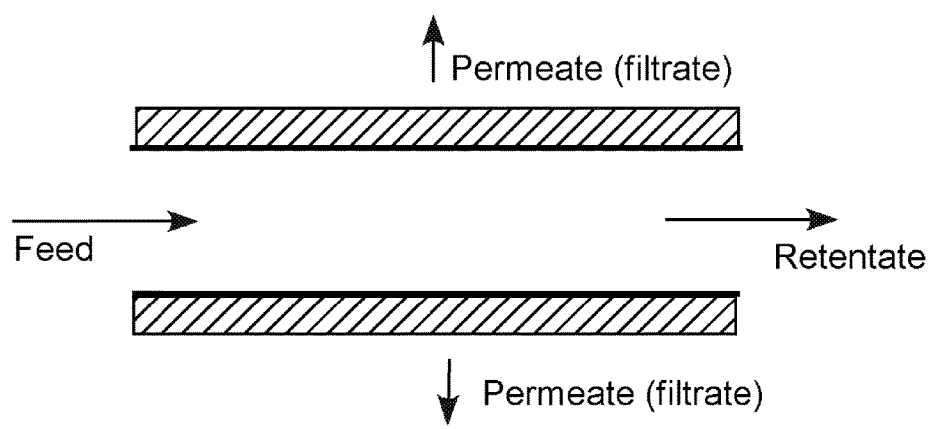
FIG. 1D

A. Axial-Flow Filtration

B. Cross-Flow Filtration

C. Effusive Filtration

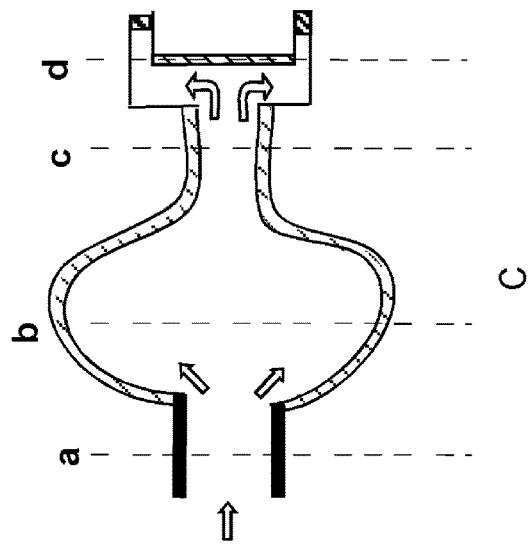
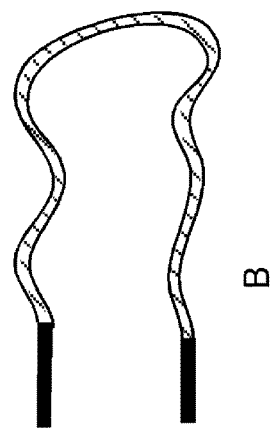
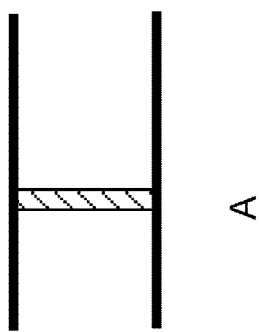
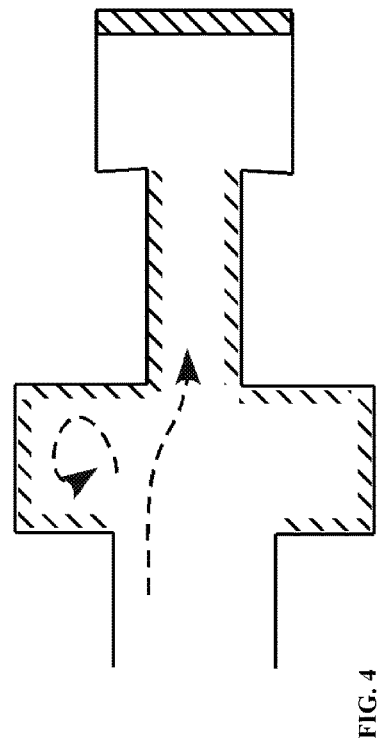
FIG. 3A
FIG. 3B
FIG. 3C
FIG. 4

FIG. 9B
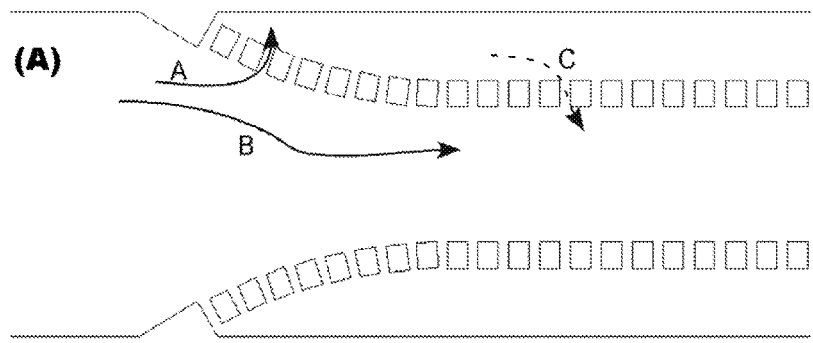
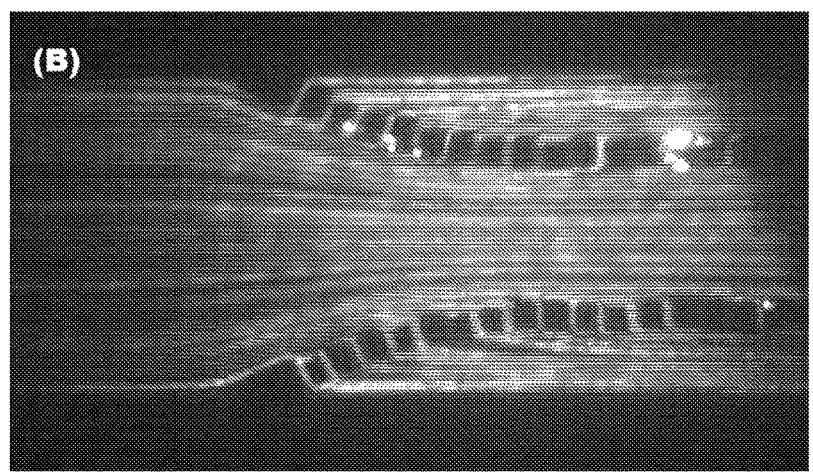
FIG. 9C
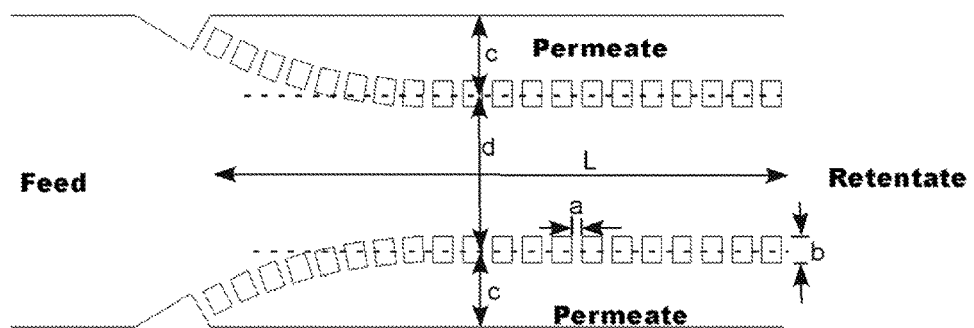
FIG. 9D

FIG. 10A
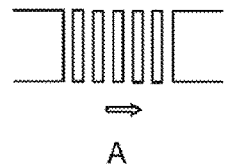
A
FIG. 10B
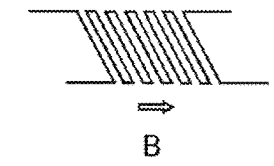
B
FIG. 10C
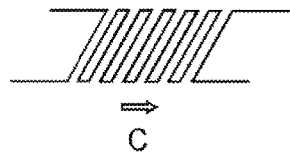
C
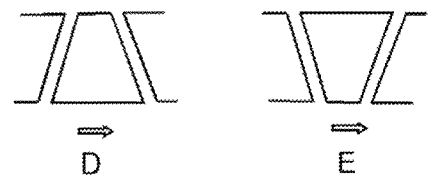
D          E
FIG. 10D   FIG. 10E
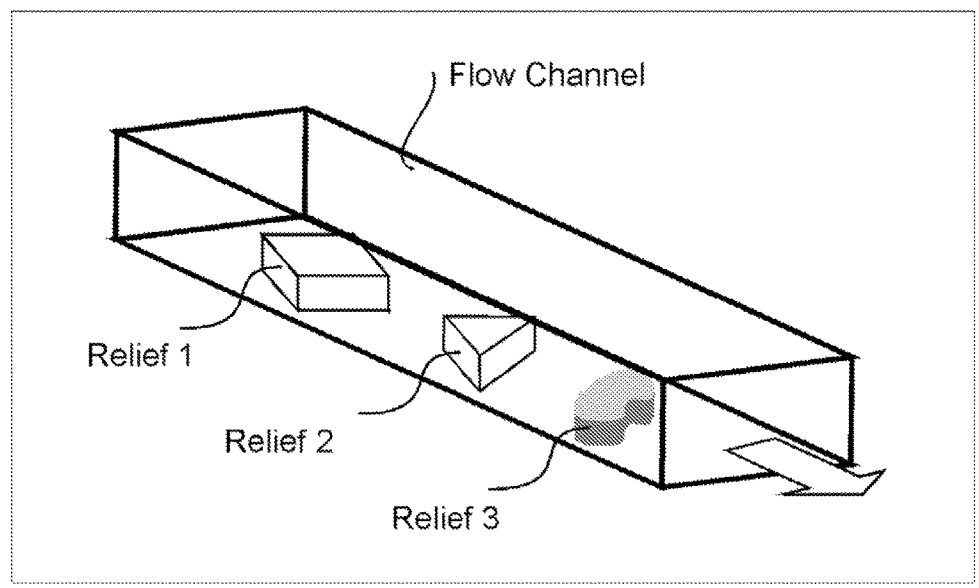
FIG. 11

BIOCHIP FOR HIGH-THROUGHPUT SCREENING OF CIRCULATING TUMOR CELLS

CROSS-REFERENCE

This application is a U.S. National Phase Application under 35 U.S.C. § 371 of International Application No. PCT/US2008/066770, filed Jun. 12, 2008, which is a continuation of U.S. patent application Ser. No. 11/766,053, filed Jun. 20, 2007, now U.S. Pat. No. 8,841,135, issued Sep. 23, 2014, the entireties of which are hereby incorporated by reference.

BACKGROUND OF THE INVENTION

Body fluid is a complex mixture of different cell types and biological particles. Blood, for example, includes plasma and cells (red blood cells, white blood cells, platelets) and the cells occupy about 55% of blood. Plasma is mostly water and it transfers proteins, ions, vitamins, enzymes, hormone, and other chemicals to cells in the body.

Red blood cells are about 6 to 8 µm in size and serve to provide oxygen to cells. White blood cells are about 10 to 13 µm in diameter and they defend the body from disease as a part of an immune system by fighting against foreign virus and bacteria. Platelets are the smallest cells, 1.5 to 3 µm, and they stop bleeding by forming blood clots.

Fluids in addition to blood, such as saliva, tear, urine, cerebral spinal fluid as well as other body fluids in contact with various organs (e.g. lung) contain mixtures of cells and bioparticles. The type and amount of cells and bioparticles that are present in a particular body fluid (e.g. blood) includes information about the health of the organism, and in the case of an infected individual, information about the diagnosis and prognosis of the disease.

In the case of cancer diagnosis and prognosis, tumor cells can exfoliate from solid tumors and transport throughout the body via the blood stream or other body fluids (e.g. lung cancer cells may exfoliate into the fluid in contact with the lung and prostate cancer cells into urine). These circulating tumor cells (CTCs) are present in extremely low concentrations, and their isolation and detection among the other cells present in the fluid is required for diagnosis and prognosis.

Biological cells are often sensitive to local pressure change because cellular membranes are not rigid. In filtering or isolating cells by mechanical exclusion, exposure of the cells to a high pressure environment can cause lysing. Lysis refers to the disintegration, rupturing, or destruction of a cell. With a cell, such a breakdown is caused by damage to the plasma (outer) membrane and subsequent loss of cell content (cytoplasm, organelles, or nucleus) resulting from the physical insult to the cell.

Because the cellular membranes of biological cells are not rigid, they are highly susceptible to deformation and damage in the process of physical exclusion or separation. This is a particularly difficult problem in isolating rare cells, because a large volume of biofluid must be processed to collect a statistically significant number of rare cells. As fluidic throughput increases, the velocity of the flow (and also of the suspended cells) typically increases, and potentially subjecting the cells to harsh collision with morphological features intended to exclude. Cellular damage can lead to a high rate of false-negative in disease diagnosis or prognosis; this issue must be mitigated or prevented in order to accurately quantify rare cells.

BRIEF SUMMARY OF THE INVENTION

Embodiments in accordance with the present invention relate to methods and apparatuses for separating, concentrating, and isolating circulating tumor cells (CTCs) or other particles. In one example, an embodiment of the present invention includes a micro-fabricated or nano-fabricated device having fluidic channels configured for flow dispersion while separating and excluding cells.

Embodiments in accordance with the present invention may arrange fluidic channels having a particular cross-sectional shape or exhibiting features that allow dispersion, distribution, or partition of the fluidic flow, in order to reduce its direct impact of cells against exclusion features. Such dispersion, distribution, or partitioning of flow effectively reduces the velocity of the cells directed at the exclusion features and is an important aspect of the device design principles behind developing a high-throughput approach to detect rare cells.

Embodiments in accordance with the present invention can be used to separate or enrich cancer cells from other cells that may be present in a body fluid. Embodiments of the present invention include devices for separating, concentrating, or isolating biological cells, while reducing the incidence of cell lysis during the separation, concentration, filtration, or isolation procedure.

BRIEF DESCRIPTION OF THE DRAWINGS

FIGS. 1A-B show simplified perspective and cross-sectional views of a conventional axial flow filtration configuration.

FIGS. 1C-D show simplified perspective and cross-sectional views of a conventional cross flow filtration configuration.

FIG. 3A illustrates an exemplary device featuring an array of 1-D channels oriented in cross flow configuration (top view, with the filtration area illustrated with hatches).

FIG. 3B illustrates an exemplary device featuring an array of 1-D channels lining an arbitrary perimeter.

FIG. 3C illustrates an exemplary device featuring an array of 1-D channels lining an arbitrary perimeter affecting the fluid velocity field.

FIG. 4 illustrates an exemplary device featuring an array of 1-D channels lining a flow channel with expansion and constriction points.

FIG. 9B shows an enlarged view of one region of the device of FIG. 9A.

FIG. 9C shows the path of fluorescent particles mapping the flow through the region of FIG. 9B.

FIG. 9D shows exemplary dimension of different portions of the region of FIG. 9B.

FIG. 10A illustrates an exemplary axial angle of the 1-D channels with respect to the main flow.

FIG. 10B illustrates an exemplary axial angle of the 1-D channels with respect to the main flow.

FIG. 10C illustrates an exemplary axial angle of the 1-D channels with respect to the main flow.

FIG. 10D illustrates an exemplary arrangement of 1-D channels with convergent axial angles with respect to the main flow.

FIG. 10E illustrates an exemplary arrangement of 1-D channels with divergent axial angles with respect to the main flow.

FIG. 11 illustrates an exemplary device with a flow channel lined with topographical reliefs.

DETAILED DESCRIPTION OF THE INVENTION

Figure 2:
FIGS. 2A-C show flow resistance diagrams of axial flow filtration, cross flow filtration, and effusive filtration, respectively.
Figure 2:
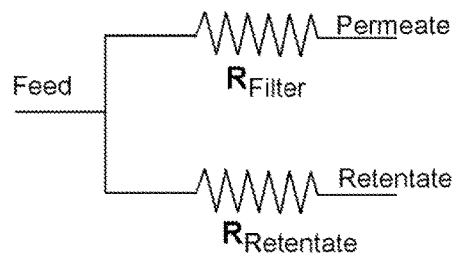
Figure 2:
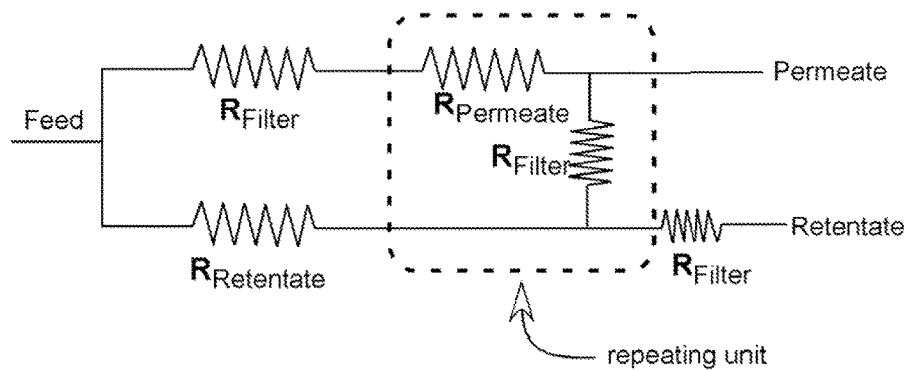

Embodiments in accordance with the present invention reduce the incidence of lysis in the separation, concentration, filtration, or isolation of cells.

U.S. Patent Publication Document 2007/0037172A1 to Chiu et al. ("the Chiu Application") is incorporated herein by reference for all purposes. The Chiu Application discloses a method and system for having a substrate including plurality of fluid flow channels with each channel configured to concurrently allow fluid flow while precluding the passage of a target cell. This class of flow channel, termed "one-dimensional channel" ("1-D channel"), has a unique advantage of preventing the build-up of excessive fluidic pressure near the cells, thus prevents the lysis of the cells.

Embodiments in accordance with the present invention relate to the use of effusive filtration to segregate tumor cells from a sample of bodily fluid. In one embodiment, fluid containing a cell is flowed down a channel having a filtration medium present along at least one side wall. The tumor cell is captured when the fluid passes through the filtration medium. Accumulated pressure on the captured tumor cell can be reduced by allowing the fluid that has passed through the filtration medium to re-enter the channel. In a particular embodiment, the filtration medium may comprise side wall apertures having a width smaller than that of the cell, with downstream apertures allowing re-entry of the fluid into the channel. In accordance with certain embodiments, the filtration medium covers an area that is at least one hundred times greater than the cross-sectional area of the flow channel.

The instant patent application discloses an array (or a geometric arrangement) of one-dimensional channels, which further prevents the cellular damage by dispersing or distributing fluidic flows to reduce the fluid velocity near the one-dimensional channels, thus preventing the cells in suspension from impinging the one-dimensional channels at an excessive velocity that could lead to cell lysis. Such geometric arrangements, although reducing the local velocity near the one-dimensional channels, actually permit the operation of the disclosed device at a high overall fluidic throughput.

The geometric arrangement of the one-dimensional channels with respect to the overall flow determines the velocity of a flow of a fluid stream that pins a cell against an aperture. Examples of such geometric arrangement factors include but are not limited to the direction, orientation, angle of the channels with respect the flow, repetitive units, the distance between 1-D channels, the lengths, the angles, and the curvatures of the filtration boundary spanned by the channels.

Embodiments of devices in accordance with the present invention may employ effusive filtration. Effusive filtration refers to geometric arrangements of filtration apertures that strategically re-direct, partition, dampen, or disperse the flow while simultaneously accomplishing the purpose of precluding a particle. The filter apertures are positioned to control the directional component of fluidic velocity that pins a cell against an aperture. In contrast to conventional approaches utilizing cross- or axial-flow filtration, effusive filtration is not limited to uni-directional flow (i.e. single direction of the main flow, either orthogonal to or in the axial direction of the aperture.)

Conventional axial flow filtration refers to a flow of a suspension of solid-fluid mixture into a "dead end" comprising the filtration media. In axial flow filtration, the filtration media (e.g. meshes, porous substrates or size-exclusion matrices) span the internal cross-sectional area of a flow channel. FIG. 1A shows a perspective view, and FIG. 1B shows a cross-sectional view, of an example of a conventional axial flow filter 100, where the filtration medium 102 obstructs the main (axial) flow 104 whose flow direction is shown by the arrow.

Cross Flow filtration, sometimes referred to as Tangential Flow filtration, refers to another conventional filtration configuration where the main flow is tangential to the filtration media. FIG. 1C shows a perspective view, and FIG. 1D shows a cross-sectional view, of an example of a conventional cross flow filter 150. The filtration media 152 may line the entire external surface of the flow conduit 154, not just limited the two side-surfaces 156 shown in the illustration. A key difference between axial-flow and cross-flow is that the flow conduit is not obstructed by the filtration media, thus allowing a higher volumetric throughput.

Effusive filtration performed in accordance with embodiments of the present invention refers to filtration configurations where the fluid is dispersed or redistributed by the filtration media or any morphological features inside the flow channel. Such dispersion or redistribution of the fluid tunes the local fluid velocity across the filtration media, in order to minimize the degree of physical impact of biological cells during the exclusion process. The flow may be dispersed in two-dimensions or three-dimensions to reduce the fluid velocity in the direction of direct impingement of the filtration medium.

Effusive filtration is neither axial-flow filtration nor cross-flow filtration. FIGS. 2A-C illustrates the differences between axial-flow, cross-flow, and effusive filtration from the perspective of resistances to flow. The resistances to flow are indicated using electrical circuit analogies.

For the conventional axial flow filtration shown in FIG. 2A, the feed flow enters the flow conduit, encounters a fluidic resistance as the flow passes through the filtration medium (indicated as $R_{Filter}$), and exits as permeate.

For the conventional cross flow filtration shown in FIG. 2B, the feed flow enters the flow conduit and is divided into two streams. One stream crosses the filter medium and exits as permeate. The other stream continues to flow along the conduit, subject to the conduit's flow resistance ($R_{Retentate}$), and exits as retentate. Thus the conventional cross flow filtration approach has two exit streams, whereas conventional axial flow only has one exit stream. Furthermore, in contrast with axial flow filtration, in cross flow filtration some portion of the feed exits as the retentate without ever crossing the filtration medium.

As shown in the diagram of FIG. 2C, effusive flow filtration in accordance with embodiments of the present invention can contain additional elements. Specifically, when the feed enters the flow conduit, it is divided into two streams, similar to cross-flow filtration. However, because of dispersion of the flow, additional fluidic resistances and flow paths are introduced. Fluidic resistances may be introduced by adjusting channel dimensions or adding morphological features such as bends, curvatures, or corners to increase the frictional loss.

FIG. 2C illustrates that, for example, after the feed passes through the filter medium ($R_{Filter}$), it is subject to the fluidic resistance of the permeate channel ($R_{Permeate}$). Depending on the relative magnitude of the resistances and the range of feed velocity, the flow direction across $R_{Filter}$ enclosed by the dash enclosure may be forward-biased (from retentate to permeate), reverse-biased (from permeate to retentate), or zero (stagnant).

The ability of effusive flow to fine-tune the flow across the filter media thus allows a precise control of the cell exclusion process. Specifically, the tumor cells may be gently excluded by tuning the local flow-bias to slightly forward-biased, even if the inlet feed maybe at a flow velocity that can lead to cell destruction.

The potential for reverse-bias (backflow) does not imply that a net backflow is present under normal operating conditions of the filter. However, the potential for reverse-bias is necessary to allow the operation to be as slightly forward-biased as possible (slightly above stagnant). The elements in dashed enclosures of FIG. 2C may be repeated as necessary before the streams finally exit as permeate and retentate.

Conventional cross flow filtration, because of the unidirectional nature of the feed, does not disperse or redistribute flow. Because the feed directly impinges upon the filtration media at full force, conventional axial flow filtration is thus incapable of reducing the degree of physical impact of cells during the exclusion process. In conventional axial flow or cross flow, once the fluid crosses the filtration media and becomes permeate it does not again traverse across the filtration media. Thus it is not possible to fine-tune the flow-bias.

Moreover, in cross flow filtration not all feed is required to cross the filtration medium. By contrast, in effusive filtration, no feed may exit without crossing the filtration medium.

One way to conceptualize effusive filtration is to take an axial flow configuration shown in FIG. 3A, where the filtration area is indicated with hatches, and expand it into a two-dimensional enclosure (FIG. 3B). Because the filtration area (now becomes a two-dimensional perimeter, lined with one-dimensional apertures) is increased, it is capable of handling a higher fluidic throughput without increasing the fluid velocity across the filtration perimeter. In particular, one characteristic of apparatuses configured to perform effusive filtration according to embodiments of the present invention, is that the area spanned by the filtration medium is at least 100 times the cross-sectional area of the flow channel traversed by the fluid prior to crossing the filtration medium.

In cases where curvatures are included as a feature of the filtration perimeter, the fluid velocity is no longer unidirectional. For example, FIG. 3C illustrates two locations Point a and Point b, that at Point b the cross-section of the flow channel is increased, as compared to Point a; by conservation of mass, the fluid velocity at Point b must be slower than Point a. As the fluid velocity is decreased, the suspended cells will impinge the filtration apertures at a slower velocity, leading to a lower likelihood of damage.

Although in some regions of an effusive filtration design the local velocity arrangement may resemble that of axial flow or cross flow, care must be taken to distinguish these situations. For example, at Point c of FIG. 3C, where the filtration apertures are tangential to the main flow, the local flow field may superficially resemble that of a cross flow configuration. With effusive filtration according to an embodiment of the present invention, however, the fluid must pass through the filtration medium at least once. This is not the case with conventional cross-flow filtration.

Because of the differences upstream and downstream, in effusive filtration the local flow field can be affected and exhibit properties different from what would normally be expected in cross-flow configuration. For example, at high velocities the filtrate that crossed the filtration perimeter near Point b (expansion) may backflow in to the main flow channel at Point c. Similarly if the fluidic resistance downstream is high, the main flow direction at Point c may be largely outwardly directed toward the filtration perimeters, rather than tangential. In another example, although one may assume that at Point d the filtration apertures are aligned in the direction of the flow, and therefore the local flow field should resemble that of axial flow, because of the expanded cross-section at Point d and the presence of exit channels, some amount of tangential flow is also expected. Thus within a flow channel, given creative positioning of filter apertures, it is entirely possible to alter the local fluid velocity vector to improve the separation of cells.

Effusive filtration is not limited to flow channels completely enclosed by a single filtration perimeter, as described in the previous example. Specifically, according to alternative embodiments of the present invention more than one perimeter may be used to accomplish effusive filtration.

FIG. 4 illustrates an example where a flow channel 400 is lined partially with filtration media 402 such as apertures. Additional filtration media is positioned downstream in the flow channel, such that the fluid may not exit without at least crossing the filtration media once. The filter apertures line the corrugated intermediate section of the channel. Again, because the cross-sectional area of the channel is not constant, fluid velocity may slow down or speed up depending on whether the cross-section is expanded or constricted. At high flow velocities the fluid may become separated to form internal circulation patterns (microvortices) 404, which may aid the filtration operation.

Effusive filtration designs and performances are dependent of operational parameters such as the range of operational velocity as well as the local fluidic resistances across the filtration perimeter vs. the main flow channel. This is in contrast with conventional axial or cross flow filtration schemes, where separation performance is largely independent of operational conditions.

Figure 5:
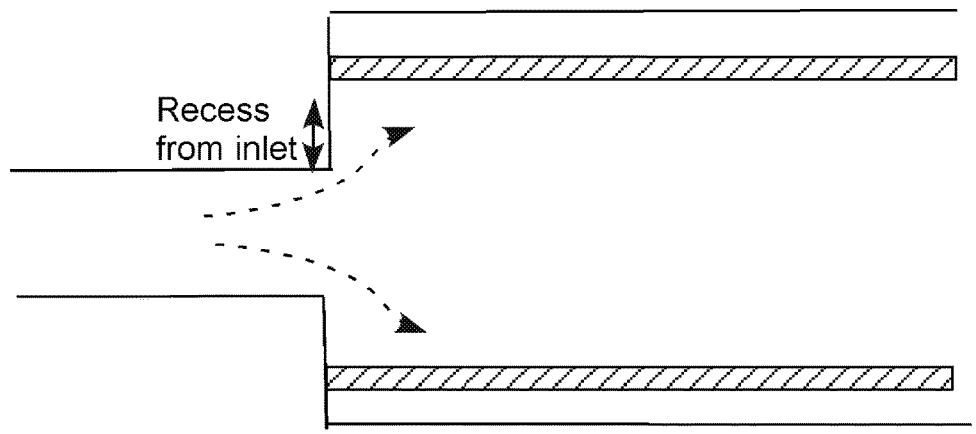
FIG. 5 illustrates an exemplary device featuring an array of 1-D channels which is recessed from the main inlet flow channel.

The recession or protrusion of the filtration perimeter from the main flow is an indication of effusive filtration. Illustrated in FIG. 5, as the filtration perimeter moves away from the inlet, more directional components of the flow pointing toward the filtration perimeters can be observed. Additional filtration media (not shown) may be positioned downstream such that the fluid may not exit the flow channel without at least crossing the filtration at least media once. If the local fluidic resistance across the filtration perimeter is low, fluid may preferentially move across the filtration perimeter, and leave behind very little tangential flow component to the main flow.

Figure 6:
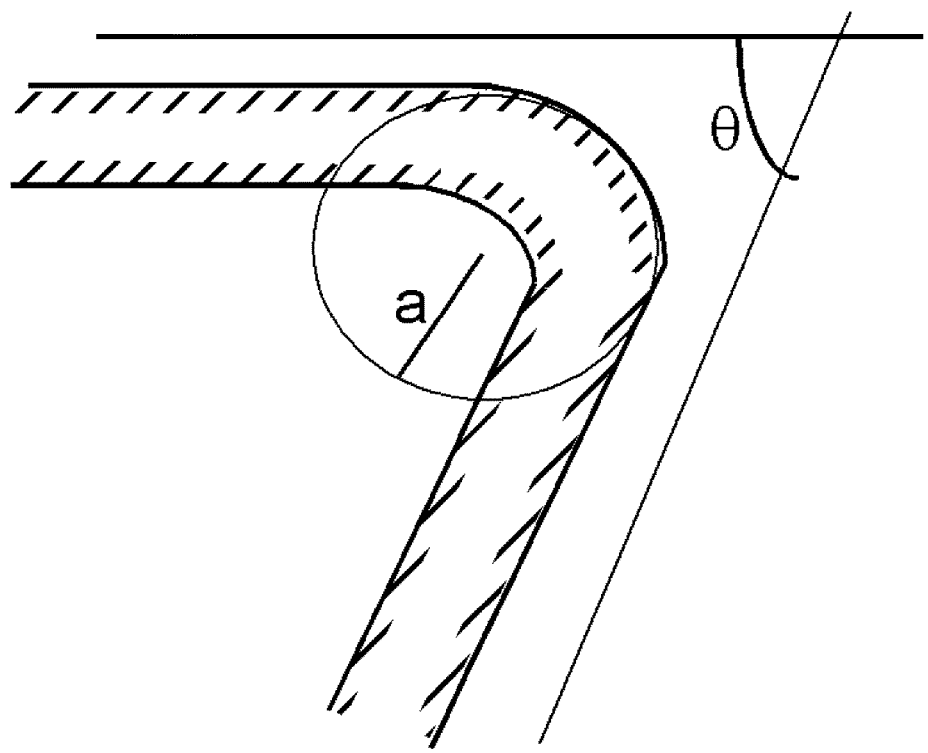
FIG. 6 illustrates an exemplary device featuring an array of 1-D channels lining a bend.

Another example of effusive filtration involves bending of fluid path. FIG. 6 illustrates a flow channel, bending at an angle θ and a radius of curvature of a, with filtration apertures lining the walls. Again, additional filtration media may be positioned downstream in the flow channel such that the fluid may not exit the flow channel without at least crossing the filtration media once. Because fluid must change direction as it enter and exit the bend, the pressure force that the fluid exerts toward the outer wall is considerably greater than that of the inner wall, both of which are lined with filter apertures.

If the ratio of the local fluidic resistance across the filter apertures against that of the main flow channel is small, depending on the pressure exerted to drive the fluid the flow may predominantly flow through the outer filtration perimeter (in a straight path), rather than largely curving along the main flow channel. Thus at locations where there may be bending of fluid path, depending on the operating fluid velocity the flow field may transform from that resembling cross flow to that resembling axial flow. By contrast, an axial-flow or cross-flow configuration cannot change its flow pattern simply because the operating velocity increases or decreases.

By altering the radius of the bend or the angle of the bend, it is also possible to alter the local velocity vector to improve the separation of cells by effusive filtration. Specifically, cells of different sizes have different hydrodynamic resistance to flow. Smaller cells in general prefer to trace the high-velocity flow, whereas larger cells lags behind and prefer areas of more stagnant flow.

When flowing into a bend, smaller cells may have a different trajectory than larger cells. Accordingly, embodiments of the present invention may include the use of fluidic bends with filtration perimeters, such that smaller cells preferentially move through the outer filter perimeter, whereas the larger cells remain in the main flow channel.

Figure 7:
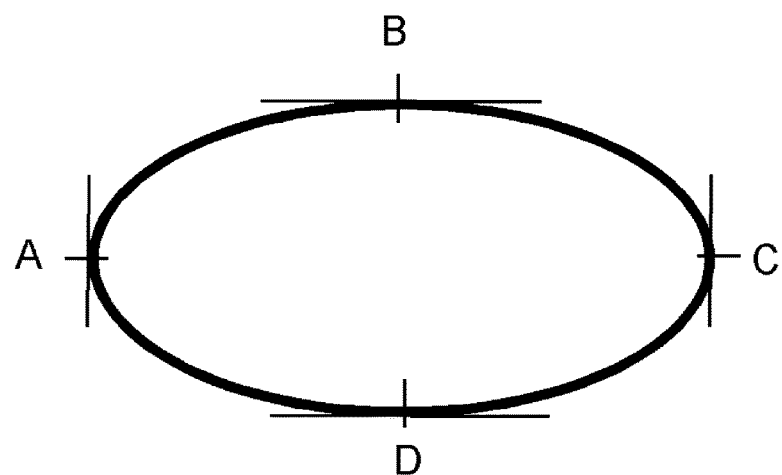
FIG. 7 illustrates vertices on a curve.

Effusive filtration may be characterized by arranging filtration apertures such that they line the perimeter(s) of a flow channel, and the perimeter(s) contain one or more vertices or cusps. A vertex is defined as a location on a line where the curvature is at a maximum or minimum. Alternatively a vertex can be defined as a location where the derivative of the curvature is zero. FIG. 7 illustrates locations of vertices of a closed elliptical curve, where Points A and C indicate vertices with maximum curvature, and Points B and D indicate vertices with minimum curvature. A cusp refers to locations where the radius of the curvature is infinite.

Figure 8A:
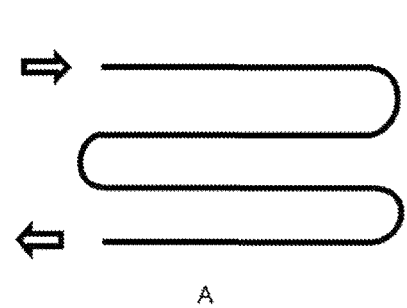
FIG. 8A illustrates an exemplary flow path which is lined with 1-D channels on the flow channel wall.
Figure 8B:
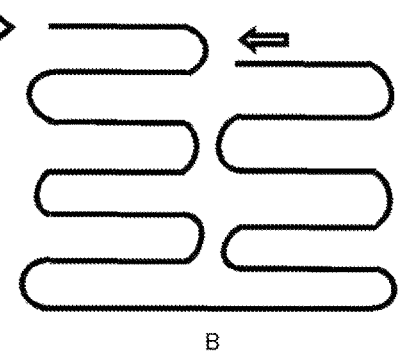
FIG. 8B illustrates an exemplary flow path which is lined with 1-D channels on the flow channel wall.
Figure 8C:
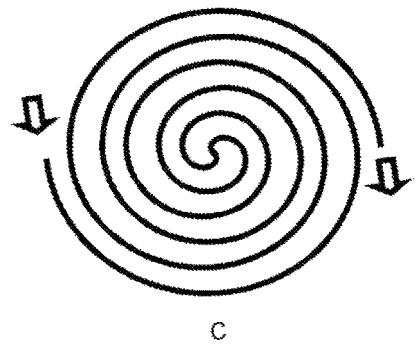
FIG. 8C illustrates an exemplary flow path which is lined with 1-D channels on the flow channel wall.

FIGS. 8A-C illustrate select examples of layout of flow channels exhibiting effusive filtration when their perimeters (or portions thereof) are lined with one-dimensional filtration apertures. In FIG. 8A, at least three vertices can be drawn on the perimeter of the flow channel. In FIG. 8B, at least 11 vertices can be drawn. There are no maximum limit of vertices in an exemplary device because the simple combination (e.g. fractal) of repetitive bending motives can result in trivial extension, as exemplified in the layout of FIG. 8C.

Figure 9A:
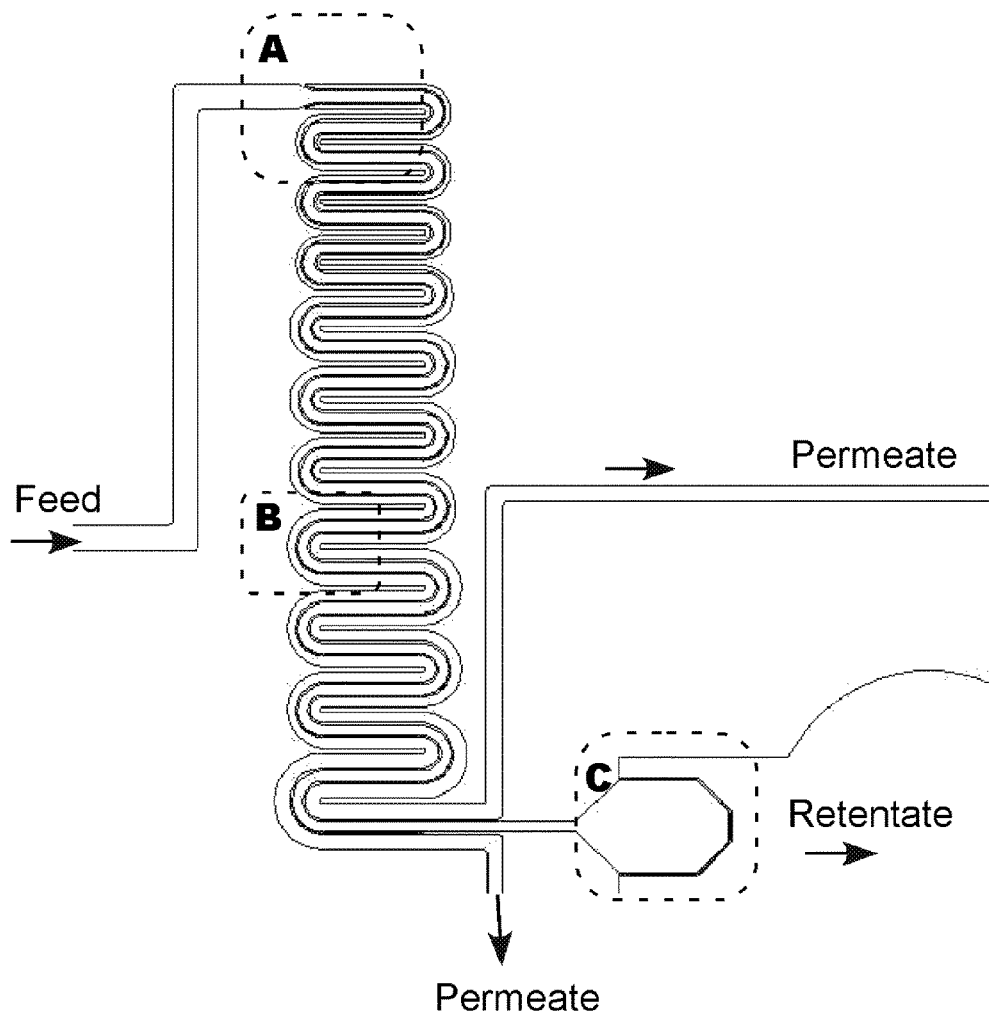
FIG. 9A shows an overview of a device for performing effusive filtration.

FIGS. 9A-H illustrate an example of a microfabricated flow channel configuration utilizing multiple features exhibiting effusive filtration as discussed above. FIG. 9A shows an overall view of the effusive filtration flow structure. The feed enters from the left and passes through a constriction to enter a serpentine chute. Two permeate streams line the two sides of the feed chute. The feed chute and each permeate stream is separated by an array of 1-D channels, which exclude the tumor cells but allow the passage of normal blood cells (e.g. platelets, erythrocytes and leucocytes). The retentate exits at the lower right corner.

The length and configuration of the chute directly affect the impinging velocity of the cells at the filtration media. Near the entrance the fluid velocity can be very high (as high as 34 msec at 10 ml/min, which is equivalent to 76 miles/hour), and a direct impact at a filtration medium oriented perpendicular to the flow will lead to instant cell lysis. By controlling the overall length of the chute up to the exit as the retentate stream, and ensuring that no filtration medium within the line-of-sight of the entrance is oriented perpendicular to the flow (the only perpendicular filtration medium is at the end of the chute, where the feed leaves as retentate), the impinging velocity is reduced to as low as 3 cm/sec. The total channel length therefore is at least 1.001 times as long as a direct distance connecting the entrance and the exit of the chute.

The dashed enclosures of FIG. 9A (Boxes (A), (B) and (C)) indicate select regions where effusive filtration is employed to accomplish cell separation Box A of FIG. 9A is located at the entrance of the filter chute, where permeate streams begin. FIG. 9B is an enlarged view of this portion of the effusive filtration device. In the example of FIG. 9B, the medium for effusive filtration is an array of 1-D channels, positioned such that they converge toward the center of the main flow.

Flow Line A illustrates the trajectory of a fluid element closer to the conduit wall, traveling to the right, but is forced through a 1-D channel when obstructed by the walls of 1-D channels at an angle, to join the permeate side of the filter. Flow Line B illustrates the trajectory of a fluid element closer to the center of the main flow, traveling essentially in parallel to the walls of the 1-D channels. Thus Flow Line A and Flow B together illustrate that the flow behavior in effusive filtration is neither purely axial-flow nor cross-flow. Flow Line C (dashed line) illustrates that, in the event the feed channel is constricted as a result of the convergence, fluid on the permeate side may overflow back across the filtration medium downstream from where the fluid element initially crossed to join the feed side.

FIG. 9C is a photograph of the streamlines of the configuration of FIG. 9B mapped using fluorescent nanoparticles.

The condition for backflow depends on the magnitude of the feed velocity, the relative fluidic resistances locally across the 1-D channels as well as the resistances of the flow conduits on the retentate side and the permeate side. Such potential for backflow does not exist in conventional axial or cross flow filtration schemes, regardless of the feed velocity. The only way for backflow in axial-flow or cross-flow is by having a negative feed flow (pressure of permeate is higher than the pressure of feed), which does not help with tuning the local velocity to accomplish cell separation.

FIG. 9D provides a view of the characteristic dimensions of an example of effusive filtration utilizing a constriction as shown above in FIG. 9B. FIG. 9D illustrates in greater detail how the relative resistances in various sections can induce flow behavior shown in FIG. 9B. The dimensional parameters are as follows. Dimension "a" represents the width of a 1-D channel for excluding biological cells. Dimension "b" represents the length (axial) of a 1-D channel. Dimension "c" represents the width of the permeate flow channel. Dimension "d" represents the width of the feed flow channel. Dimension "L" represents the length of the feed channel before exiting as the retentate. The length of the permeate channel may be the same or different from that of the feed (retentate) channel.

Should c (the width of the permeate channel) become smaller than d (the width of the main feed channel), the flow resistance in the permeate channel ($R_{permeate}$) is now large with respect to the flow resistance in the main feed channel ($R_{retentate}$), then as a increases the likelihood of backflow (Flow line C in FIG. 9B) increases. These parameters (a-d) can be varied in the same device to achieve the desired effusive filtration system. For example, a may be narrower in the upstream portion of the channel, then broaden progressively downstream of the channel. Similarly, as a is narrower in the upstream portion, b may be longer upstream than downstream to further increase the resistance across the 1-D channel to help disperse the flow.

Box B of FIG. 9A shows a portion of the effusive filtration flow structure exhibiting a sequence of 180-degree turns; FIG. 9E is an enlarged view showing the use of one of these bends to disperse the flow.

Flow Lines A and B illustrate the trajectories of fluid elements in a 180-degree bend, where a portion of the outer wall of the bend is a filtration medium consisting of an array of 1-D channels. Flow Line A illustrates that, because the walls of 1-D channels does not provide sufficient centripetal force to keep the fluid element in a circular trajectory, the fluid element traverses through the 1-D channels and join the permeate side. Flow Line B illustrates that fluid elements closer to the inner side of the bend can follow a path parallel to the bend. The ratio of permeate to retentate (flows across the filtration medium and that remaining the main flow conduit) is highly dependent of the feed velocity.

Figure 9F:
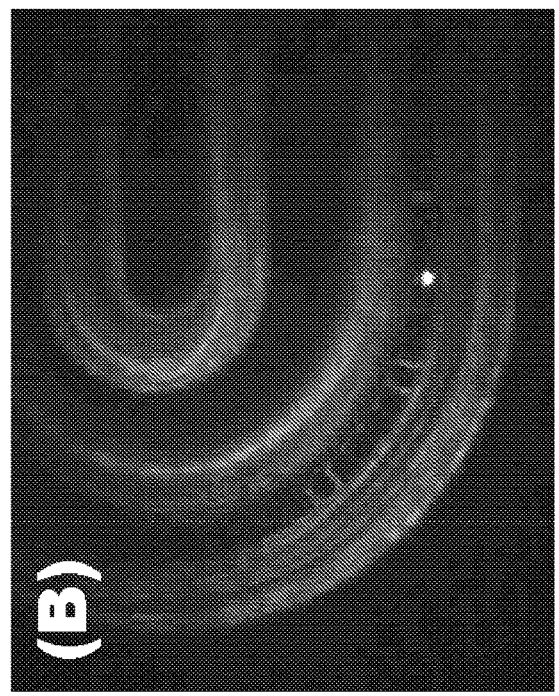
FIG. 9F shows the path of fluorescent particles mapping the flow through the region of FIG. 9E.
Figure 9E:
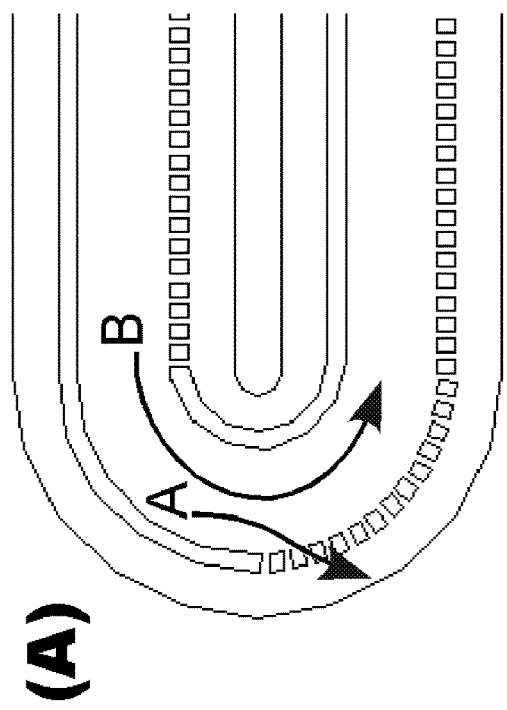
FIG. 9E shows an enlarged view of another region of the device of FIG. 9A.

FIG. 9F is a photograph of the streamlines of the effusive filtration feature of FIG. 9E mapped using fluorescent nanoparticles.

In cross flow filtration, increasing the feed velocity generally results in poor separation performance because the fluid velocity component tangent to the filtration media does not force the materials through the filter. In the limit of extremely high feed velocity, the inlet feed composition is essentially the same as the retentate composition, because the feed traverses through the main flow conduit so quickly that the filtration medium behaves as if it is an impenetrable boundary.

By contrast, in this example of effusive filtration, increasing the feed velocity can result in an improvement in separation. Increasing the feed velocity results in higher centrifugal force experienced by objects traveling through the bend, thus objects of different sizes or densities may be preferentially separated. In addition, centrifugal force also results in forcing more portion of the feed through 1-D channels, thus increasing the permeate and improving the separation. This performance enhancement is contrary to cross-flow filtration.

The placement of 1-D channels need not be regularly spaced. 1-D channels may be separated by a large distance (a long wall) which may be used to alter the directions of the fluid. For example, the upstream outer boundary of the bend provided necessary centripetal force to keep the fluid traveling through an arc.

Figure 9G:
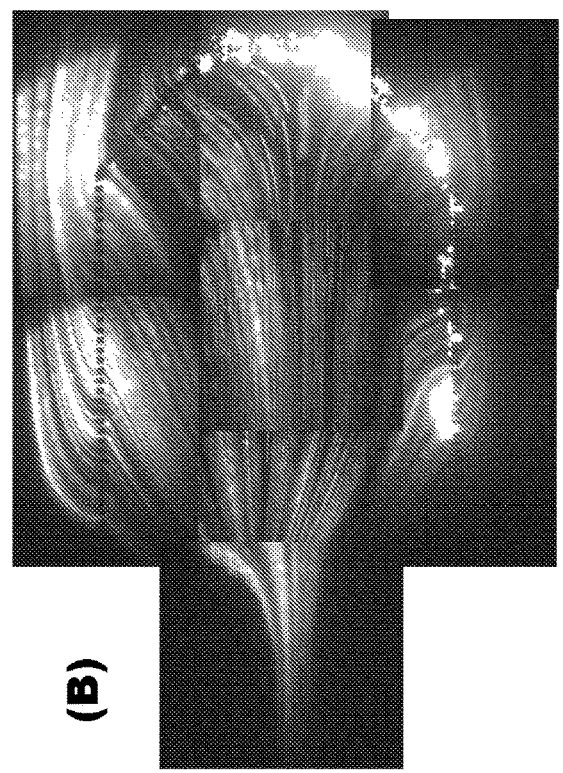
FIG. 9G shows an enlarged view of another region of the device of FIG. 9A.

Box C of FIG. 9A shows the end of the filter where an array of 1-D channels prevents the tumor cells from exiting into the retentate. FIG. 9G is an enlarged view of this portion of the effusive filtration device. Owing to expansion of the flow channel, this figure is also an example of effusive filtration where the feed is dispersed to distribute the fluid velocity to improve filtration.

As shown in FIG. 9G, because the flow conduit features an expansion upstream, the fluid velocity now contains two components: horizontal along the direction of inlet feed; and vertical along the direction of expansion. Flow Line A illustrates a flow trajectory where it is largely horizontal. Flow Line B (dashed line) illustrates a flow trajectory that is largely parallel to the expanding wall, and results in a flow largely tangential to the 1-D channels. Flow line B occurs when the fluidic resistance of the filtration medium crossed by Flow Line D is larger than the fluidic resistance of the filtration media crossed by Flow Line A or C.

Flow Lines C and D illustrate trajectories that have comparable horizontal and vertical components. Flow Line B (dashed line) illustrates a flow trajectory that is largely parallel to the expanding wall, and results in a flow largely tangential to the 1-D channels. Flow line B replaces Flow Line D when the fluidic resistance of the filtration medium ordinarily crossed by Flow Line D is larger than the fluidic resistance of the filtration media crossed by Flow Line A or C (e.g. if the filter section crossed by Flow Line D has 10 nm-wide 1-D channels whereas the sections crossed by Lines A and C have 20-um-wide 1-D channels; or that when the filter section crossed by Flow Line D is blocked by cells such that the fluidic resistance increases dynamically).

Thus in a closed filtration system, it is possible to exhibit characteristics of tangential flow (Flow Line B), as well as axial flow (Flow Line A). However, because of the flow dispersing and the positioning of the 1-D channels, the fluid velocity impinging on the 1-D channels is decreased significantly comparing to the inlet feed velocity. The resulting reduction in physical impact against the walls of the 1-D flow channel is one of the possible advantages offered by use of effusive filtration in accordance with embodiments of the present invention for separating biological cells.

Figure 9H:
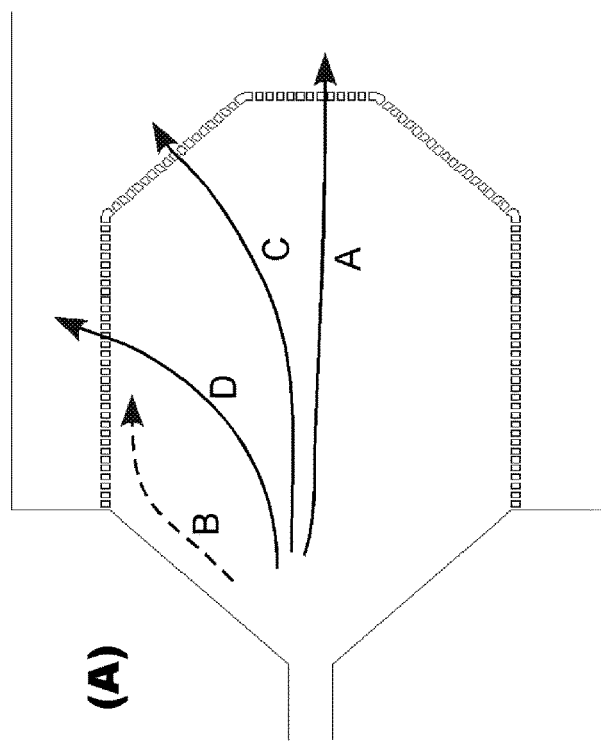
FIG. 9H shows the path of fluorescent particles mapping the flow through the region of FIG. 9G.

FIG. 9H is a photograph of the streamlines of FIG. 9G mapped using fluorescent nanoparticles.

The previous description describes lining the planar perimeter of flow channels with filter apertures. However, it is also possible to line the top and bottom planes (i.e. planes parallel to the flow channels, thus forming the top and bottom walls of the flow channel) with 1-D filter apertures as examples of effusive filtration.

The axial direction of a 1-D channel need not be oriented perpendicular to the main flow. In accordance with alternative embodiments, the axial direction of the channel may be oriented at various angles (between −180 degrees to +180 degrees) relative to the main flow. FIGS. 10A-E illustrate examples where 1-D apertures may be oriented at an arbitrary angle to the main flow, such that they may have divergent axial directions, convergent axial directions, parallel axial directions, or random axial directions.

The axial length of a one-dimensional channel need not be a straight line. As an example, the axial length of a one-dimensional channel may include curvatures to form tortuous flow paths to increase the flow resistance across the one-dimensional channel. These tortuous paths may be characterized by the presence of one or more vertices.

Still other embodiments in accordance with the present invention may include more than one effusive filtration flow channel, in serial, parallel, or combinations thereof.

Figure 17A:
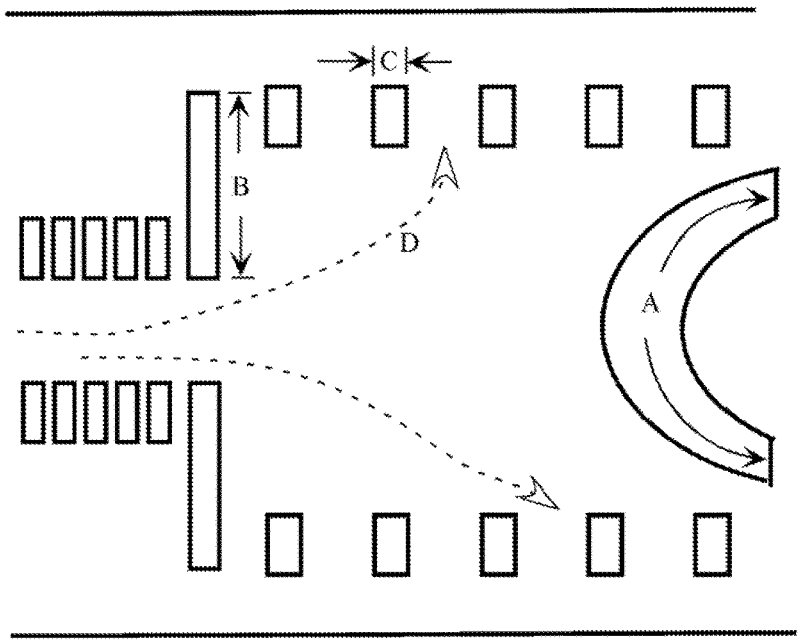
FIG. 17A shows a simplified view of a flow channel having apertures with different spacings.

In addition to varying the geometry and placement of the channel and filtration medium, various attributes of the filtration medium itself can be varied to achieve effusive filtration. For example aperture dimensions or spacings, can be varied to accomplish filtration having the desired characteristics. For example, FIG. 17A illustrates different spacing between apertures that can exist to achieve effusive filtration. Distance A spans the length of curved wall that is between two apertures; Distance B spans the length of a long rectangular wall that is between an aperture and the retentate flow channel; and Distance C spans the length of a short rectangular wall that is between two apertures. In effusive filtration, Distances A, B, and C may be varied to disperse flow and reduce the impact of cells on the aperture. For example, the curved wall (spanned by Distance A) deflects the horizontal component of the incoming flow and divides the incoming flow into two opposing directions; if the curved wall comprises of filtration media, the horizontal flow is not deflected and the majority of the flow would have been directed at the filtration media on the curved wall at full velocity. The spacing between the apertures serves important functions of directing, diverting, partitioning, and retarding the flow.

Figure 17B:
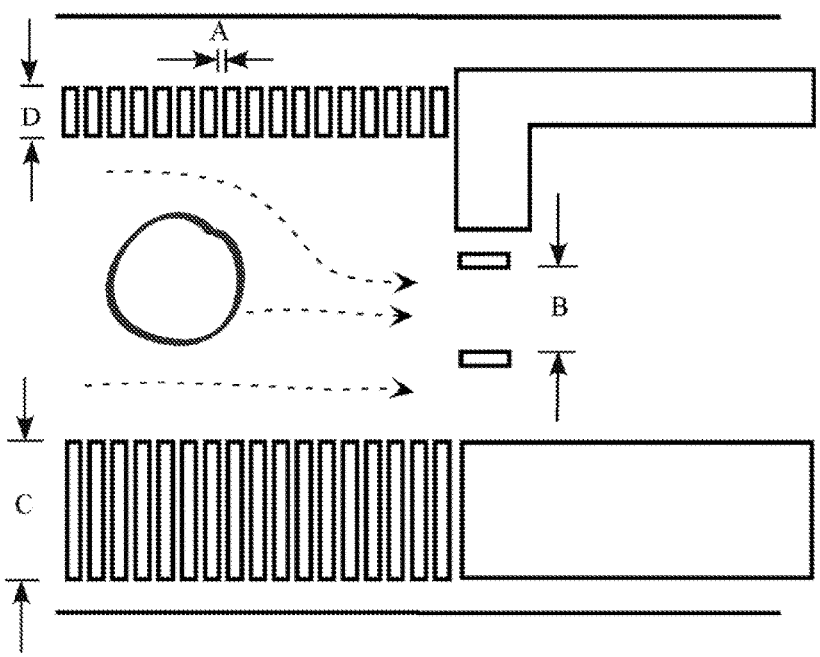
FIG. 17B shows a simplified view of a flow channel having apertures of different dimensions.

FIG. 17B illustrates different aperture widths and axial lengths that can exist to achieve effusive filtration. Fluidic resistance of an aperture depends on both the width of the aperture as well as the axial length of the aperture. The wider the width, the lower the resistance. The shorter the axial length, the lower the resistance. Thus axial length works in the same way as the width of an aperture in dispersing the flow to reduce fluidic velocity. The cross-sectional shape of an aperture need not be rectangular as illustrated in this and other embodiments. In general any aperture with convex cross-sectional geometry, such that the aperture width is smaller than the width of the objected to be excluded and the aperture diameter is larger than the diameter of the object, may be used.

In the embodiment of FIG. 17B, width A is between two closely-spaced rectangular features, whereas Width B is between two farther-spaced rectangular features. Because of the differences in aperture sizes, flowing through downstream aperture (with width B) is a path of lower resistance; hence the main flow direction is from left to right. However, if Width B is made smaller than Width A, then the main flow direction is then from the center of the flow channel upward (through upper apertures with width A). By tuning the aperture sizes, it is then possible to alter the direction of fluid flow and reduce the impact velocity of cells in an exclusion event. For example, as the flow is increasingly diverted through the upper apertures (with width A), the horizontal flow is reduced and the impact momentum at downstream aperture (with width B) is reduced. FIG. 17B also illustrates two different axial lengths (C and D) that can be present to accomplish effusive filtration.

Embodiments of devices in accordance with the present invention may perform one or more functions before the filtration. As an example, biofluids may be stabilized with additional reagents, including but not limited to anticoagulants such as citrate, heparin, ethylenediamine tetraacetic acid (EDTA), diethylenetriamine pentaacetic acid (DTPA), 1,2-diaminocyclohexane tetraacetic acid (DCTA), or ethylene bis(oxyethylenenitrilo) tetraacetic acid (EGTA); aldehydes such as methylol, hydrorxymethyl derivatives of amines or amides of formaldehyde, diazolinidinyl urea, imidazolidinyl urea, methenamine, paraformaldehyde, glutaraldehyde, or glyoxal.

Embodiments of devices in accordance with the present invention may perform one or more functions following the filtration. As an example, reagents may be perfused to selectively label or accentuate the isolated cells. Examples of such reagents include fluorescent, immunofluorescent, dye-conjugated molecules (such as antibodies, fab fragments, aptamers, ligands, agonists, antagonists, or combinations thereof) magnetic, electroactive, bioactive, or photoactive compounds. An example is to use a stain that reacts with cytokeratins, which are integral components of the cytoskeleton in epithelial cancerous cells. Other dye examples include fluoresceine isothiocyanate (FITC)-conjugated mose anti-human epithelial antibody (HEA) and phycoerythrin (PE)-conjugated anti-CD45. Other examples of dye-conjugated antibodies include but are not limited to the pan-cytokeratin antibody A45B/B3, AE1/AE3, or CAM5.2 (pan-cytokeratin antibodies that recognize Cytokeratin 8 (CK8), Cytokeratin 18 (CK18), or Cytokeratin 19 (CK19) and ones against: breast cancer antigen NY-BR-1 (also known as B726P, ANKRD30A, Ankyrin repeat domain 30A); B305D isoform A or C (B305D-A ro B305D-C; also known as antigen B305D); Hermes antigen (also known as Antigen CD44, PGP1); E-cadherin (also known as Uvomorulin, Cadherin-1, CDH1); Carcino-embryonic antigen (CEA; also known as CEACAM5 or Carcino-embryonic antigen-related cell adhesion molecule 5); β-Human chorionic gonadotophin (β-HCG; also known as CGB, Chronic gonadotrophin, β polypeptide); Cathepsin-D (also known as CTSD); Neuropeptide Y receptor Y3 (also known as NPY3R; Lipopolysaccharide-associated protein3, LAP3, Fusion; Chemokine (CXC motif, receptor 4); CXCR4); Oncogene ERBB1 (also known as c-erbB-1, Epidermal growth factor receptor, EGFR); Her-2 Neu (also known as c-erbB-2 or ERBB2); GABA receptor A, pi ($\pi$) polypeptide (also known as GABARAP, GABA-A receptor, pi ($\pi$) polypeptide (GABA A($\pi$), γ-Aminobutyric acid type A receptor pi ($\pi$) subunit), or GABRP); ppGalNac-T(6) (also known as β-1-4-N-acetyl-galactosaminyl-transferase 6, GalNActransferase 6, GalNAcT6, UDP-N-acetyl-d-galactosamine:polypeptide N-acetylgalactosaminyltransferase 6, or GALNT6); CK7 (also known as Cytokeratin 7, Sarcolectin, SCL, Keratin 7, or KRT7); CK8 (also known as Cytokeratin 8, Keratin 8, or KRT8); CK18 (also known as Cytokeratin 18, Keratin 18, or KRT18); CK19 (also known as Cytokeratin 19, Keratin 19, or KRT19); CK20 (also known as Cytokeratin 20, Keratin 20, or KRT20); Mage (also known as Melanoma antigen family A subtypes or MAGE-A subtypes); Mage3 (also known as Melanoma antigen family A 3, or MAGA3); Hepatocyte growth factor receptor (also known as HGFR, Renal cell carninoma papillary 2, RCCP2, Protooncogene met, or MET); Mucin-1 (also known as MUC1, Carcinoma Antigen 15.3, (CA15.3), Carcinoma Antigen 27.29 (CA 27.29); CD227 antigen, Episialin, Epithelial Membrane Antigen (EMA), Polymorphic Epithelial Mucin (PEM), Peanut-reactive urinary mucin (PUM), Tumor-associated glycoprotein 12 (TAG12)); Gross Cystic Disease Fluid Protein (also known as GCDFP-15, Prolactin-induced protein, PIP); Urokinase receptor (also known as uPR, CD87 antigen, Plasminogen activator receptor urokinase-type, PLAUR); PTHrP (parathyrold hormone-related proteins; also known as PTHLH); BS106 (also known as B511S, small breast epithelial mucin, or SBEM); Prostatein-like Lipophilin B (LPB, LPHB; also known as Antigen BU101, Secretoglobin family 1-D member 2, SCGB1-D2); Mammaglobin 2 (MGB2; also known as Mammaglobin B, MGBB, Lacryglobin (LGB) Lipophilin C (LPC, LPHC), Secretoglobin family 2A member 1, or SCGB2A1); Mammaglobin (MGB; also known as Mammaglobin 1, MGB1, Mammaglobin A, MGBA, Secretoglobin family 2A member 2, or SCGB2A2); Mammary serine protease inhibitor (Maspin, also known as Serine (or cystein) proteinase inhibitor Glade B (ovalbumin) member 5, or SERPINB5); Prostate epithelium-specific Ets transcription factor (PDEF; also known as Sterile alpha motif pointed domain-containing ets transcription factor, or SPDEF); Tumor-associated calcium signal transducer 1 (also known as Colorectal carcinoma antigen CO17-1A, Epithelial Glycoprotein 2 (EGP2), Epithelial glycoprotein 40 kDa (EGP40), Epithelial Cell Adhesion Molecule (Ep-CAM), Epithelial-specific antigen (ESA), Gastrointestinal tumor-associated antigen 733-2 (GA733-2), KS1/4 antigen, Membrane component of chromosome 4 surface marker 1 (M4S1), MK-1 antigen, MIC18 antigen, TROP-1 antigen, or TACSTD1); Telomerase reverse transcriptase (also known as Telomerase catalytic subunit, or TERT); Trefoil Factor 1 (also known as Breast Cancer Estrogen-Inducible Sequence, BCEI, Gastrointestinal Trefoil Protein, GTF, pS2 protein, or TFF1); or Trefoil Factor 3 (also known as Intestinal Trefoil Factor, ITF, p1.B; or TFF3).

Examples of bioactive compounds include enzymes such as alkaline phosphatase (AP), horseradish peroxidase (HRP), β-Galactosidase and their chemiluminescent, colometric, or chemifluorescent substrates, which include but are not limited to TMB (3,3',5,5'-Tetramethylbenzidine), OPD (o-phenylene Diamine, ABTS (2,2'-azinodiethylbenzthiazoline sulfonate), chlornaphthol, AEC (3-amino-9-ethylcarbazole), DAB (Diaminobenzidine), pNPP (p-Nitrophenyl Phosphate), BCIP/NBT (Bromochloroindolyl Phosphate-Nitro blue Tetrazolium.

As cancer cells are composed of heterogeneous population, additional reagents may be perfused to distinguish the subpopulations. For example, cancer cells contains a distinct yet limited subset of highly tumorigenic cells that share the property of normal "stem cells"; that is, these cells proliferate extensively or indefinitely and that they effectively give rise to additional solid tumors. These cancer stem cells may be distinguished from ordinary cancer cells by perfusing multiple reagents that selectively bind to biomarkers, which may include but are not limited to CD44, CD2, CD3, CD10, CD14, CD16, CD24. CD31, CD45, CD64 or CD140b.

Another example of functions includes selective reactions to identify cellular contents (e.g. DNA or proteins encapsulated within cells). These reactions include Polymerase Chain Reaction (PCR), Real-Time Polymerase Chain Reaction (RT-PCR) methylation reactions of DNA, or aptamer (short strands of DNA)-selective reactions.

One or more walls forming the one-dimensional channels may be made from optically transparent material, such that an exemplary device may be placed under a microscope for inspection and viewed through such walls.

The channel surfaces may be treated with anticoagulant compounds, compounds that preferentially bind to circulating tumor cells, or compounds that prevent the sticking of cells.

Embodiments of devices in accordance with the present invention may incorporate additional resistive heating elements to perform on-chip cellular assays such as Polymerase Chain Reaction (PCR) or Real-Time Polymerase Chain Reaction (RT-PCR).

Embodiments of devices in accordance with the present invention may incorporate electrodes to manipulate the trajectory of select cells or biofluids to enhance the separation base on phenomena such dielectrophoresis or electrowetting.

Embodiments of devices in accordance with the present invention may include magnetic elements to manipulate the trajectory of select cells to improve separation base on the magnetic susceptibility of the cells or the micro-magnetic or nano-magnetic particles attached to the cells.

Embodiments of devices in accordance with the present invention may incorporate electrodes to conduct on-chip chemical assay such as electrophoresis or eletrochromatography.

Electric field or magnetic field may be applied to force a subpopulation of cells to deviate from the normal flow pattern and enhance the separation of cells.

Embodiments of devices in accordance with the present invention may include acoustical elements to manipulate the trajectory of select cells with acoustical energy (e.g. acoustophoresis, ultrasonic or megasonic waves) to improve cell separation based on the response of cells to compressive pressure waves.

Embodiments of devices in accordance with the present invention may include a photo, electro, acoustical or magnetic detector to track the motion of select cells or to enumerate select cells present. For example, the present invention may be used in conjunction with a flow cytometer, so the analyte is substantially enriched of the desired cells prior to reaching the detector.

Embodiments of devices in accordance with the present invention may incorporate multiple flow channels connecting to the main separation channel to inject additional fluid to alter the local velocity.

Topographical features or relief patterns may be incorporated into the walls of the channels to create pressure gradients which may favor concentrating or dispersing of select cells. FIG. 11 illustrates how such relief patterns may be incorporated. The arrow indicates the direction of the flow. Relief 1 shows a diamond shaped relief at the bottom of the flow channel. Relief 2 shows a triangular shaped relief at the bottom of the flow channel. The reliefs may span any or combinations of the four walls that form the main flow channel. Multiple relief or combinations of different shapes of relieves may be used. The shapes of the relieves can be any arbitrary shape, shown as in Relief 3.

EXAMPLES

Example 1

Figure 12:
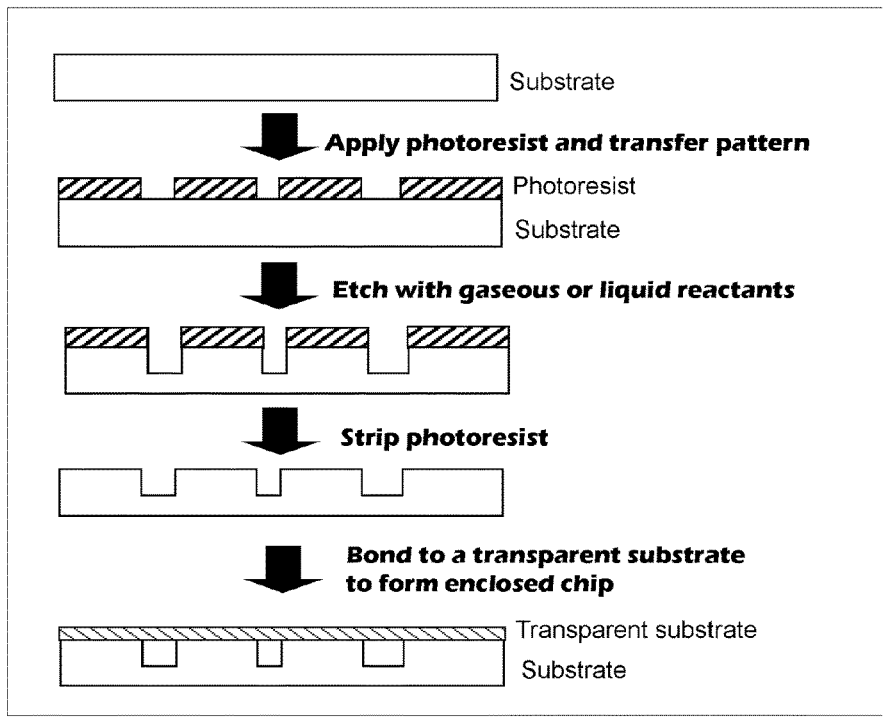
FIG. 12 illustrates a production method to manufacture an exemplary device.

Embodiments in accordance with the present invention may be fabricated using a variety of methods. FIG. 12 shows a lithographic technique to directly fabricate features on such a chip. First, a photoresist is spin-coated onto a substrate and exposed to UV radiation through a photomask to transfer the pattern from the photomask to the photoresist. The substrate is then exposed to gaseous or liquid reactants to etch through the open regions of the photoresist. The photoresist is then removed and the substrate, now consisting of recessed flow channels, is then bonded to a transparent substrate to form an enclosed chip.

Example 2

Figure 13:
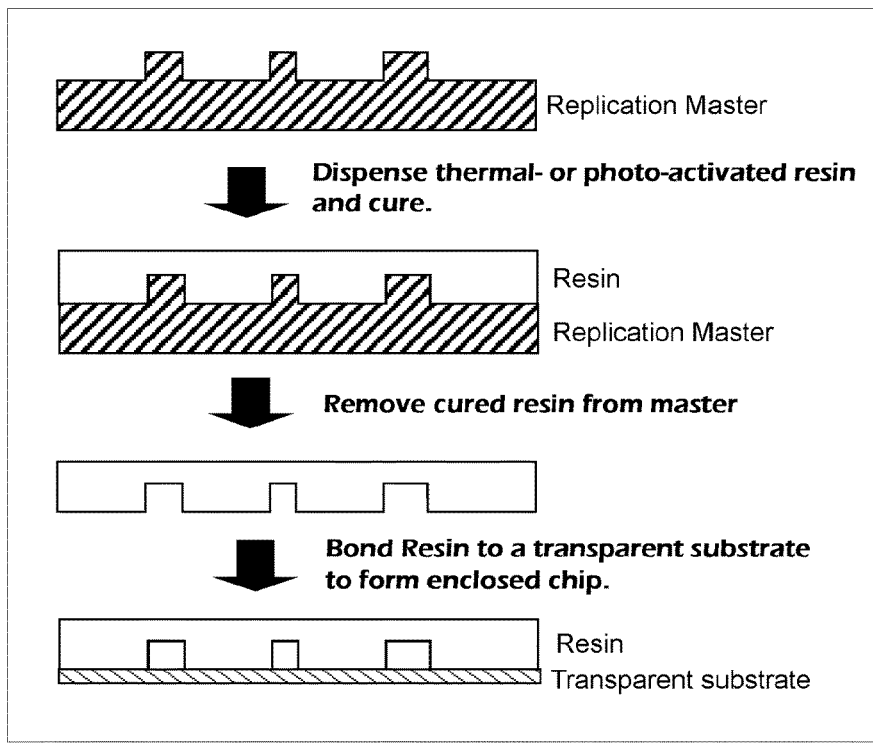
FIG. 13 illustrates a production method to manufacture an exemplary device.

Alternatively a replication technique may be used to fabricate such a device (FIG. 13). A replication master with relief features is used as a mold to cast polymer against. The liquid polymer resin is dispensed onto the replication master and may be cured thermally or with radiation, depending on the initiators used. The cured resin may be removed from the master and then bonded to a transparent substrate to form an enclosed chip.

Example 3

Figure 14:
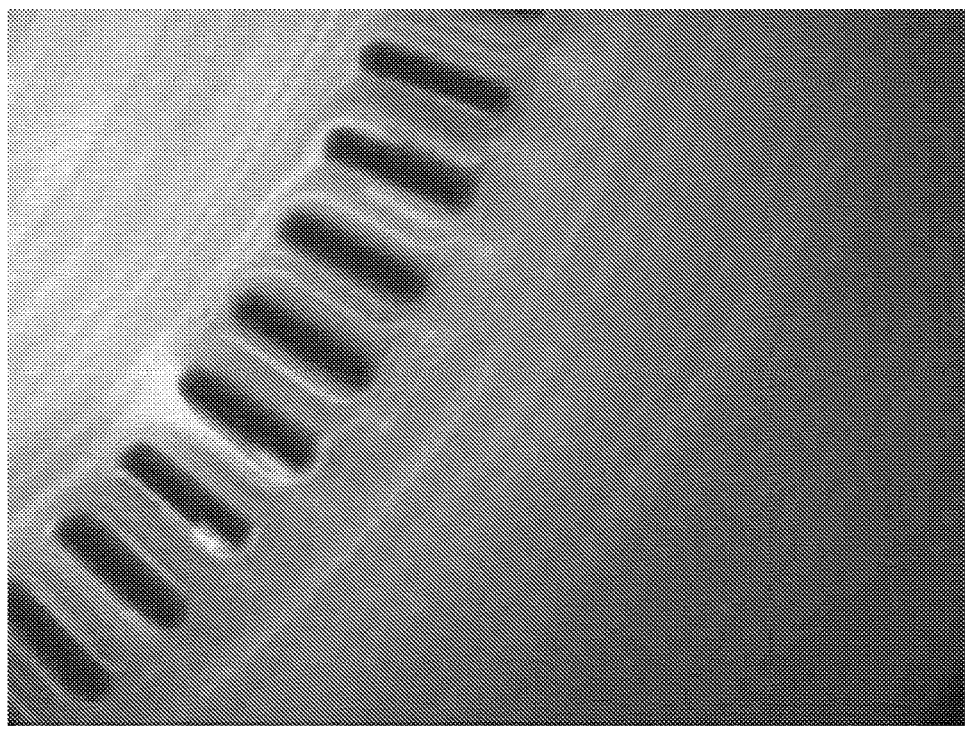
FIG. 14 is a photograph of a flow profile in an exemplary device as mapped using fluorescent microparticles.

The flow profile inside an exemplary device is mapped using 100 nm fluorescent microparticles. In FIG. 14 the light streaks indicate the trajectory of the fluorescent particles. Some particles follow a bending path tangential to the filtration apertures and some traverses the filtration apertures. The intensity and density of fluorescent microparticles indicate the fluid velocity.

Example 4

Figure 15:
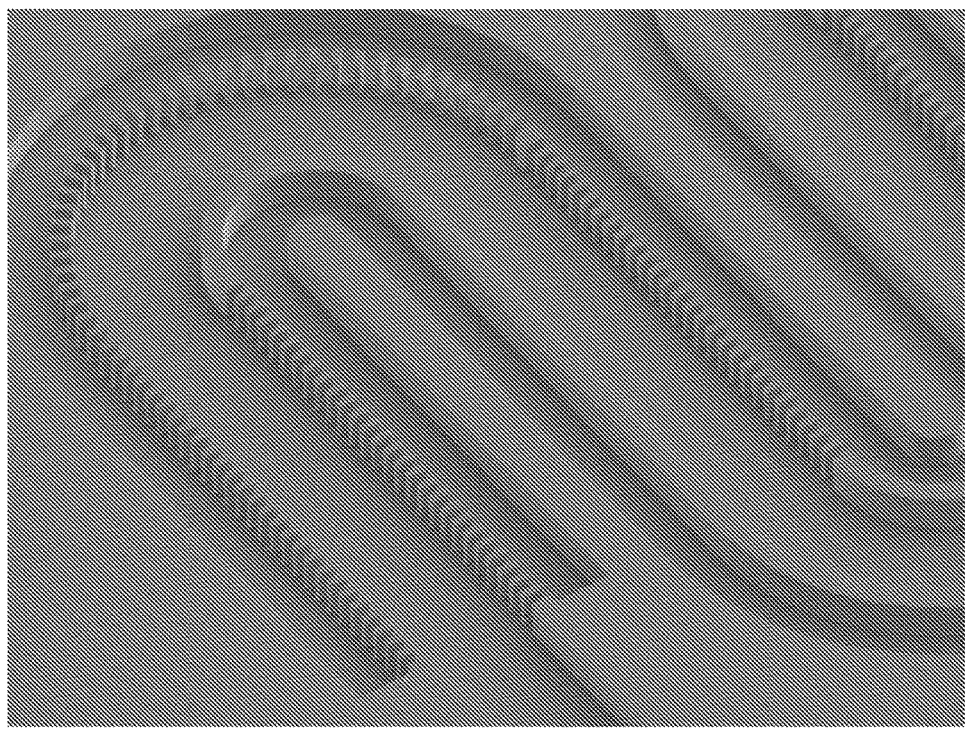
FIG. 15 is a Scanning Electron Microscopy (SEM) image of an exemplary device.

Portion of the exemplary device shown in FIG. 9A was imaged using Scanning Electron Microscopy (SEM) to reveal the fine details of an effusive filtration design (FIG. 15).

Example 5

Figure 16A:
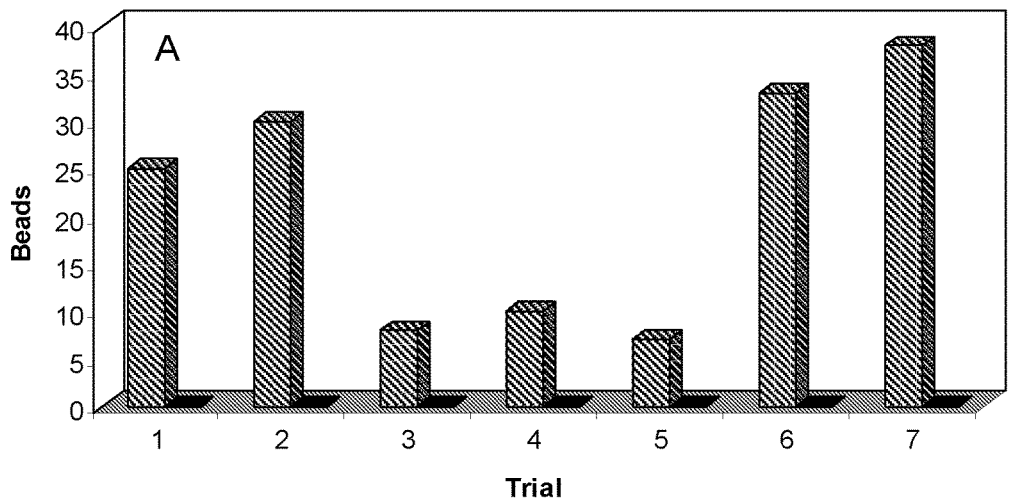
FIG. 16A illustrates the results of filtration efficiency of 2-μm microbeads in an exemplary device.

Microparticles of various sizes were injected into an exemplary device to investigate the separation efficiency. FIG. 16A illustrates the recovery of 2-µm microbeads over 7 separate trial runs in an exemplary device intended to capture cancer cells: the number of microbeads injected into an exemplary device are marked in hatch, whereas the number of beads captured are marked in black. No 2-µm microbeads were captured in all 7 runs.

Figure 16B:
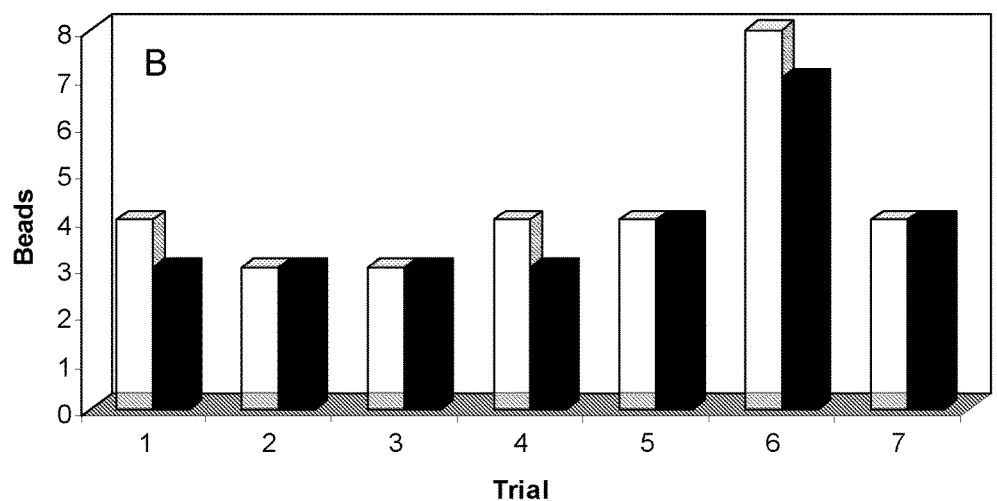
FIG. 16B illustrates the results of filtration efficiency of 15-μm microbeads in an exemplary device.

FIG. 16B illustrates the recovery of 15-µm microbeads over 7 separate trial runs in an exemplary device intended to capture cancer cells. Again, the number of microbeads injected into an exemplary device are marked in hatch, whereas the number of beads captured are marked in black. In all cases, nearly all of the 15-µm microbeads were captured, indicating nearly 100% of separation efficiency between 2-µm (comparable to red blood cells) and 15-µm (comparable to cancer cell) microbeads.

The device may incorporate assay protocols following the cell isolation or enrichment, which includes, but is not limited to: nucleic-acid based methods such as RNA extraction (with or without amplification), cDNA synthesis (reverse transcription), gene microarrays, DNA extraction, Polymerase Chain Reactions (PCR) (single, nested, quantitative real-time, or linker-adapter), or DNA-methylation analysis; cytometric methods such as fluorescence in situ hybridization (FISH), laser capture microdissection, flow cytometry, fluorescence activated cell sorting (FACS), cell culturing, or comparative genomic hybridization (CGH) studies; and chemical assay methods such as electrophoresis, Southern blot analysis or enzyme-linked immunosorbent assay (ELISA).

Embodiments of devices according to the present invention may incorporate fluorescence (single or multi-color) microscopy imaging in various configurations, which include but are not limited to bright-field, epi, confocal, DIC (differential interference contrast), dark-field, Hoffman, or phase-contrast.

In one example, the present subject matter includes a substrate material including, but not limited to, polymeric materials (polydimethylsiloxane (PDMS), polymethylmethacrylate (PMMA), polyethylene, polyester (PET), polytetrafluoroethylene (PTFE), polycarbonate, parylene, polyvinyl chloride, fluoroethylpropylene, lexan, polystyrene, cyclic olefin copolymers, polyurethane, polyestercarbonate, polypropylene, polybutylene, polyacrylate, polycaprolactone, polyketone, polyphthalamide, cellulose acetate, polyacrylonitrile, polysulfone, epoxy polymers, thermoplastics, fluoropolymer, and polyvinylidene fluoride, polyamide, polyimide), inorganic materials (glass, quartz, silicon, GaAs, silicon nitride), fused silica, ceramic, glass (organic), metals and/or other materials and combinations thereof.

In addition, the substrate can be fabricated of porous membranes, woven or non-woven fibers (such as cloth or mesh) of wool, metal (e.g. stainless steel or Monel), glass, paper, or synthetic (e.g. nylon, polypropylene, polycarbonate, parylene, and various polyesters), sintered stainless steel and other metals, and porous inorganic materials such as alumna, silica or carbon.

The channel surfaces may be modified chemically to enhance wetting or to assist in the adsorption of select cells, particles, or molecules. Surface-modification chemicals may include but not limited to silanes such as trimethylchlorosilane (TMCS), hexamethyldisilazane (HMDS), (Tridecafluoro-1,1,2,2-tetrahydrooctyl)trichlorosilane, chlorodimethyloctylsilane, Octadecyltrichlorosilane (OTS) or γ-methyacryloxypropyltrimethyoxy-silane; polymers such as acrylic acid, acrylamide, dimethylacrylamide (DMA), 2-hydroxyethyl acrylate, polyvinylalcohol (PVA), poly(vinylpyrrolidone (PVP), poly(ethylene imine) (PEI), Polyethylene glycol (PEG), epoxy poly(dimethylacrylamide (EP-DMA), or PEG-monomethoxyl acrylate; surfactants such as Pluronic surfactants, Poly(ethylene glycol)-based (PEG) surfactants, sodium dodecylsulfate (SDS) dodecyltrimethylammonium chloride (DTAC), cetyltriethylammonium bromide (CTAB), or Polybrene (PB); cellulose derivatives such as hydroxypropylcellulose (HPC), or hydroxypropylmethylcellulose (HPMC); amines such as ethylamine, diethylamine, triethylamine, or triethanolamine, fluorine-containing compounds such as those containing polytetrafluoroethylene (PTFE) or Teflon.

The flow can be delivered by, for example, methods and devices that induce hydrodynamic fluidic pressure, which includes but is not limited to those that operate on the basis of mechanical principles (e.g. external syringe pumps, pneumatic membrane pumps, vibrating membrane pumps, vacuum devices, centrifugal forces, and capillary action); electrical or magnetic principles (e.g. electroosmotic flow, electrokinetic pumps piezoelectric/ultrasonic pumps, ferrofluidic plugs, electrohydrodynamic pumps, and magnetohydrodynamic pumps); thermodynamic principles (e.g. gas bubble generation/phase-change-induced volume expansion); surface-wetting principles (e.g. electrowetting, chemically, thermally, and radioactively induced surface-tension gradient).

In addition, fluid drive force can be provided by gravity feed, surface tension (like capillary action), electrostatic forces (electroosmotic flow), centrifugal flow (substrate disposed on a compact disc and rotated), magnetic forces (oscillating ions causes flow), magnetohydrodynamic forces and a vacuum or pressure differential.

Embodiments in accordance with the present invention may be used in a wide variety of applications in biology and diagnosis of disease, including capturing cancer cells or cancer stem cells from body fluids for cancer prognosis; parasites such as *giardia* or cryptosporidium for water quality monitoring, capturing; malaria-infected erythrocytes for malaria diagnosis; lymphocytes and leucocytes for HIV monitoring; fetal cells in maternal blood for disease screening; stem cells for therapy; prion-infected cells for prion-related (e.g. mad cow) disease screening.

One embodiment in accordance with the present invention relates generally to methods and systems to isolate or enrich tumor cells in biofluids for the diagnosis of cancer, and in particular but not by way of limitation, to methods and systems that reduce cell lysis or cellular membrane damage during the isolation or enrichment of tumor cells.

The spreading of cancer cells from the primary tumor is an important factor governing the probability of relapse and the survival rate in cancer patients. Often it has been argued that metastases rather than the primary tumors are responsible for most tumor deaths. Clinically the rate of metastases is quite high: about 50% of breast cancer cases that were thought to be localized can become metastatic, and even 30% of patients with node-negative diagnosis can be expected to develop distant metastases within five years.

Since cancer cells have the ability to stimulate angiogenesis, as the cells grow unregulated and lose their ability to adhere to each other, they can enter the blood and lymphatic circulation and circulate throughout the body. These cells are often referred to as Circulating Tumor Cells (CTC), Disseminated Tumor Cells (DTC), Circulating Cancer Cells (CCC), Circulating Epithelial Cells (CEC), Occult Tumor Cells (OTC), or other similar permutations to indicate the mobile nature of these cells, in contrast to the specimens obtained by direct biopsy of solid tumors. CTCs have been detected in the blood of patients suffering from all major cancers: prostate, ovarian, breast, gastric, colorectal, renal, lung, pancreatic, and others.

CTCs in blood can be used as an additional prognostic factor for the cancer patients. The strength of a CTC test is in its ability to measure how cancer cells disseminate, before they become tumors large enough to be detectable by imaging methods. The most important benefit—that of saving life—is its role in determining whether a treatment is effective. A cancer patient can also expect significant cost-saving if a CTC test can eliminate unnecessary (and often not covered by insurance) Computed Tomography (CT) or Positron Emission Tomography (PET) scans, or shorten the drug treatments that are ineffective.

Accurate isolation and detection of CTCs is not a trivial task. CTCs are present in extremely low concentration in the peripheral blood, estimated to be on the order of one tumor cell per 10E6 to 10E7 mononuclear cells, which is equivalent to one tumor cell per 0.5 ml to 5 ml of peripheral blood. At such low concentration, a sample with estimated 100 million cells must be screened in order to detect at least one CTC with 99.995% certainty. An automatic digital microscopy (ADM) scanning at a typical speed of 800 cells/second would require 18 hours to complete a sample that size, and even with an improved optical system, it is estimated that the scanning task would still require about one hour with additional manual examination.

According to an embodiment of the present invention, a biofluid sample may be injected into the device described in the present invention, which contains an array of one-dimensional channels to exclude the CTCs. As the biofluid moves through the device, the concentration of CTC is increased (enriched) as undesirable components of blood, such as platelets, red blood cells, and white blood cells, preferentially exit the one-dimensional channels. The exit side of the one-dimensional channels may be interconnected to larger flow channels to facilitate the removal of the undesirable components. A collection area for CTCs may be constructed by surrounding an open area with one-dimensional channels.

In one embodiment, an array of one-dimensional channels can be integrated into a diagnostic device to facilitate the collection and enrichment of leucocytes and malaria-infected erythrocytes in the diagnosis of malaria. Severe malaria is caused by the parasite *Plasmodium falciparum*. The parasite invades the erythrocytes in blood, and its maturation process causes the erythrocytes to lose deformability. The physical changes of invaded erythrocytes at the cellular level include the incorporation of knob-associated histidine-rich protein (KAHRP) in the cellular membrane, increased internal viscosity due to the parasite presence, and a more spherical surface-to-volume ratio. Microfluidic observations have provided visual confirmation that parasitized erythrocytes frequently result in capillary blockage, which has been proposed as the underlying pathogenesis mechanism.

Current diagnostic protocol for malaria diagnosis includes microscopic examination of blood smear and the visual identification of malarial parasites. Two microscopy procedures are recommended by the Center for Disease Control (CDC) and the World Health Organization (WHO): in thick smear preparation, erythrocytes are lysed, and a microscopist visually counts the number of parasites against the leucocytes present in 100 fields under 100× oil-immersion objective and converts the ratio accordingly; in thin smear preparation, erythrocytes are not lysed, and a microscopist examines 300 fields under the same magnification and counts the parasitized erythrocytes among normal erythrocytes.

Embodiments according to the present invention can be applied to the field of malaria diagnostics. The apparatus can selectively isolate leucocytes as well as parasitized erythrocytes while allowing normal erythrocytes to pass though. The present subject matter also acts as a cell concentrator as the isolated cells accumulate in an enclosed volume, thus reducing the number of fields necessary to achieve the same cell counts compared to the thick smear protocol. In addition, one example of the present subject matter provides a reduced pressure drop across the substrate.

In addition to malaria, the present subject matter can be used for monitoring of CD4+ T-lymphocytes (CD4+ T-cells) in Human Immunodeficiency Virus (HIV) diagnostic and monitoring. The absolute CD4+ T-lymphocyte count can serve as a criterion to initiate antiretroviral therapy and opportunistic infection prophylaxis in HIV-infected patients. The reduction of CD4+ T-lymphocytes, which is a subpopulation of leucocytes (white blood cells), strongly correlates to the decline of the immunological defense. Monitoring of CD4+ T-lymphocytes (CD4+ T-cells) level every 3-6 months in all HIV-infected persons has been recommended by the CDC Public Health Service as a way to initiate appropriate treatment strategies and to evaluate treatment efficacy.

In some laboratories, the absolute CD4+ T-cell number is established using the product of three laboratory techniques: the total white blood cell count, the percentage of white blood cells that are lymphocytes, and the percentage of lymphocytes that are CD4+ T-cells. Single platform flow cytometers such as FACSCount (BD Biosciences) are commercially unavailable in some developing countries or as a portable device.

Embodiments according to the present subject matter can be used to remove erythrocytes and accumulate leucocytes prior to appropriate immunophenotyping to distinguish CD4+ T-lymphocytes from other leucocytes. Lymphocytes can be distinguished from other leucocytes (e.g. monocytes and granulocytes) on the basis of size, granularity, or morphology and the absolute distinction of CD4+ T-cell within lymphocytes can be accomplished via immunophenotyping. In manual counting methods such as commercially-available Dynabeads and Cytospheres, erythrocytes must be lysed with appropriate reagents so leucocytes can be clearly seen, since the ratio of leucocyte to erythrocyte in whole blood is 1:1000. Employing chemical lysing reagents, however, has been known to reduce CD4+ T cell counts by as much as 10% when compared to no-lyse methods because lysing agents can lead to destruction of the cell membrane as well as the epitopes for fluorescence labeling. This type of cell count reduction occurs nonuniformly among subclasses of leucocytes. In HIV monitoring, where falling T-cell count signals the progression of the disease, such erroneous reduction in absolute count can misguide the physicians in interpreting the progress of treatment.

Additional possible applications for separation, concentration, and/or isolation addressed by embodiments in accordance with the present invention, include fetal cell monitoring in maternal blood for prenatal diagnostic of genetic disorders and prion detection.

A prion includes a small infectious proteinaceous particle which resists inactivation by procedures that modify nucleic acids. In addition, embodiments according to the present subject matter can be used with fetal cells (fetal cells are larger than maternal cells) and other micro-biological particulates or nano-biological particulates.

Fluid flow control devices, such as those enumerated with regard to methods and devices for inducing hydrodynamic fluid pressure or fluid drive force, can be coupled to an input port or an output port of the present subject matter. In one example, multiple ports are provided at either or both of the inlet and outlet and one or more ports are coupled to a fluid flow control device.

What is claimed is:

1. An apparatus for filtering a fluid, the apparatus comprising:
   a first serpentine flow channel and a second flow channel, wherein the first serpentine flow channel comprises an entry and a first exit, and wherein the second flow channel comprises a second exit that is different from the first exit;
   a serpentine side wall comprising a first surface, a second surface, and a first filtration medium therebetween, the first filtration medium extending continuously from the entry to the first exit and comprising a plurality of apertures disposed in the serpentine side wall and connecting the first serpentine flow channel in fluid communication with the second flow channel, wherein the first surface of the serpentine side wall comprises a side of the first serpentine flow channel and the second surface of the serpentine side wall comprises a side of the second flow channel and wherein each aperture extends from the first flow channel at the first surface to the second flow channel at the second surface; and
   a second filtration medium comprising apertures and enclosing the first exit, wherein the first filtration medium and the second filtration medium are each a portion of the first serpentine flow channel such that no fluid traveling through the first serpentine flow channel from the entry of the first serpentine flow channel traverses the first exit or the second exit without first crossing the first filtration medium or the second filtration medium at least once.

2. The apparatus of claim 1, wherein each aperture of the first filtration medium or the second filtration medium defines a gap having a width smaller than a width of a biological particle in the fluid.

3. The apparatus of claim 2, wherein the gap allows the fluid to move around the biological particle so as to pass through the apertures of the first filtration medium.

4. The apparatus of claim 2, wherein each aperture of the first filtration medium or the second filtration medium has an axial direction oriented at an angle to an axial direction of the first serpentine flow channel.

5. The apparatus of claim 1, wherein the first serpentine flow channel comprises a bend, a constriction, or a chamber.

6. The apparatus of claim 1, wherein each aperture of the first filtration medium or the second filtration medium defines an area, wherein a sum of the areas of the apertures in the filtration medium is at least 100 times a cross-sectional area of the first serpentine flow channel.

7. The apparatus of claim 1, wherein the first serpentine flow channel comprises a constriction and the first filtration medium or the second filtration medium comprises a plurality of apertures at the constriction, each aperture of the first filtration medium or the second filtration medium defines a gap having a width smaller than a width of a biological particle in the fluid.

8. The apparatus of claim 7, wherein the gap allows the fluid to move around the biological particle and pass through the each aperture of the first filtration medium or the second filtration medium.

9. The apparatus of claim 1, wherein the first serpentine flow channel comprises a bend and the first filtration medium or the second filtration medium comprises a plurality of apertures at an outside wall of the bend, each aperture of the first filtration medium or the second filtration medium defining a gap having a width smaller than a width of a biological particle in the fluid.

10. The apparatus of claim 9, wherein the gap allows the fluid to move around the biological particle and pass through the apertures of the first filtration medium.

11. The apparatus of claim 1, wherein the apertures of the second filtration medium include an array of channels proximate the first exit of the first serpentine flow channel.

12. The apparatus of claim 1, wherein at least some of the apertures of the second filtration medium have an axial direction oriented in-line with an axial direction of the first serpentine flow channel.

* * * * *